(12) United States Patent
Valliappan et al.

(10) Patent No.: US 9,451,466 B2
(45) Date of Patent: Sep. 20, 2016

(54) BASE STATION EMPLOYING SHARED RESOURCES AMONG ANTENNA UNITS

(71) Applicant: QUALCOMM Incorporated, San Diego, CA (US)

(72) Inventors: Nachiappan Valliappan, San Diego, CA (US); Christophe Chevallier, San Diego, CA (US); Andrei Dragos Radulescu, San Diego, CA (US); Cong Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 14/105,007

(22) Filed: Dec. 12, 2013

(65) Prior Publication Data

US 2014/0269547 A1  Sep. 18, 2014

Related U.S. Application Data

(60) Provisional application No. 61/798,252, filed on Mar. 15, 2013.

(51) Int. Cl.
| | |
|---|---|
| *H04W 4/00* | (2009.01) |
| *H04W 16/02* | (2009.01) |
| *H04W 28/04* | (2009.01) |
| *H04W 16/32* | (2009.01) |
| *H04W 88/08* | (2009.01) |

(52) U.S. Cl.
CPC .............. *H04W 16/02* (2013.01); *H04W 16/32* (2013.01); *H04W 28/04* (2013.01); *H04W 88/085* (2013.01)

(58) Field of Classification Search
USPC ....... 370/329, 311, 335, 342, 252, 280, 312, 370/315, 400, 318, 320, 349, 437, 465, 469
See application file for complete search history.

(56) References Cited

U.S. PATENT DOCUMENTS

| | | | | |
|---|---|---|---|---|
| 5,602,836 | A | * | 2/1997 | Papadopoulos ....... H04J 3/1694 370/280 |
| 6,438,120 | B1 | * | 8/2002 | Gustavsson et al. ......... 370/335 |
| 6,956,948 | B1 | * | 10/2005 | Hwang et al. ................. 380/46 |
| 8,437,290 | B2 | | 5/2013 | Kalhan |
| 8,817,735 | B1 | * | 8/2014 | Oroskar et al. ............... 370/329 |
| 8,837,271 | B1 | * | 9/2014 | Mansour et al. ............. 370/208 |

(Continued)

FOREIGN PATENT DOCUMENTS

| | | |
|---|---|---|
| EP | 1513297 A1 | 3/2005 |
| EP | 1924109 A1 | 5/2008 |
| WO | 2012156482 A1 | 11/2012 |

OTHER PUBLICATIONS

International Search Report and Written Opinion—PCT/US2014/027483—ISA/EPO—Dec. 11, 2014.

(Continued)

*Primary Examiner* — Phuongchau Ba Nguyen
(74) *Attorney, Agent, or Firm* — Muncy, Geissler, Olds & Lowe, P.C.

(57) ABSTRACT

A base station includes a base unit and a plurality of remote antenna units (RAUs). Each of the RAUs includes a physical layer circuit (PHY). The PHYs are configured to each use the same physical layer identifier, but each PHY includes its own hardware for supporting users in the coverage area of that PHY. The base unit controls resource allocation for the RAUs to increase the capacity of the base station and/or reduce interference between PHYs.

29 Claims, 18 Drawing Sheets

(56) References Cited

U.S. PATENT DOCUMENTS

| | | | | |
|---|---|---|---|---|
| 2007/0249340 | A1* | 10/2007 | Hiltunen et al. | 455/433 |
| 2008/0102872 | A1* | 5/2008 | Liu | 455/522 |
| 2008/0310329 | A1* | 12/2008 | Sun et al. | 370/280 |
| 2010/0008280 | A1* | 1/2010 | Ornbo et al. | 370/312 |
| 2010/0208777 | A1 | 8/2010 | Ogaz | |
| 2010/0273468 | A1* | 10/2010 | Bienas | H04W 24/02 455/418 |
| 2010/0296816 | A1 | 11/2010 | Larsen | |
| 2010/0317351 | A1 | 12/2010 | Gerstenberger et al. | |
| 2011/0039560 | A1* | 2/2011 | Hratko et al. | 455/436 |
| 2011/0236024 | A1 | 9/2011 | Mao | |
| 2011/0274097 | A1 | 11/2011 | Zhang et al. | |
| 2013/0172031 | A1 | 7/2013 | Calippe et al. | |
| 2014/0029521 | A1* | 1/2014 | Puthenpura et al. | 370/329 |
| 2014/0269547 | A1* | 9/2014 | Valliappan et al. | 370/329 |

OTHER PUBLICATIONS

Cellular News: "Large Scale Femtocell Deployments and DAS Indoor Solution," Jul. 16, 2008, pp. 3. Retrieved from the Internet: URL:http://www.cellular-news.com/story/32431.php [Retrieved on Feb. 28, 2014].

Kaul A., "Femtocells and Distributed Antenna Systems Complementary or Competitive?" ABI Research, 2009, pp. 1-12.

Ngai P., "Distributed Antenna Systems for Indoor Cellular Network," Ezine articles, Jun. 19, 2009, pp. 2. Retrieved from the Internet: URL: http://ezinearticles.com/?Distributed-Antenna-Systems-For-Indoor-Cellular-Network&id=2636531 [Retrieved on Feb. 28, 2014].

Osborn C., "Choosing Small Cells, WiFi, DAS or a Combination?," Ubee AirWalk, Jan. 30, 2012, pp. 2. Retrieved from the Internet: URL: http://www.airwalkcom.com/2012/01/choosing-small-cells-wifi-das-or-a-combination/ [Retrieved on Feb. 28, 2014].

Scheinert S., "InFocus: Pico Cells, Femto Cells, and DAS," Connected Palnet, Dec. 15, 2006, pp. 5. Retrieved from the Internet: URL: http://connectedplanetonline.com/wireless/technology/pico_femto_cells_121506/ [Retrieved on Feb. 28, 2014].

Shey D., et al., "In-Building Wireless Systems: Connecting Networks and Services" Worldwide Deployment Scenarios and Equipment Forecasts for Active, Passive and Distributed Antenna Systems, Repeaters, Antennas, Picocells and Femtocells, ABI Research, 2008, pp. 1-126.

* cited by examiner

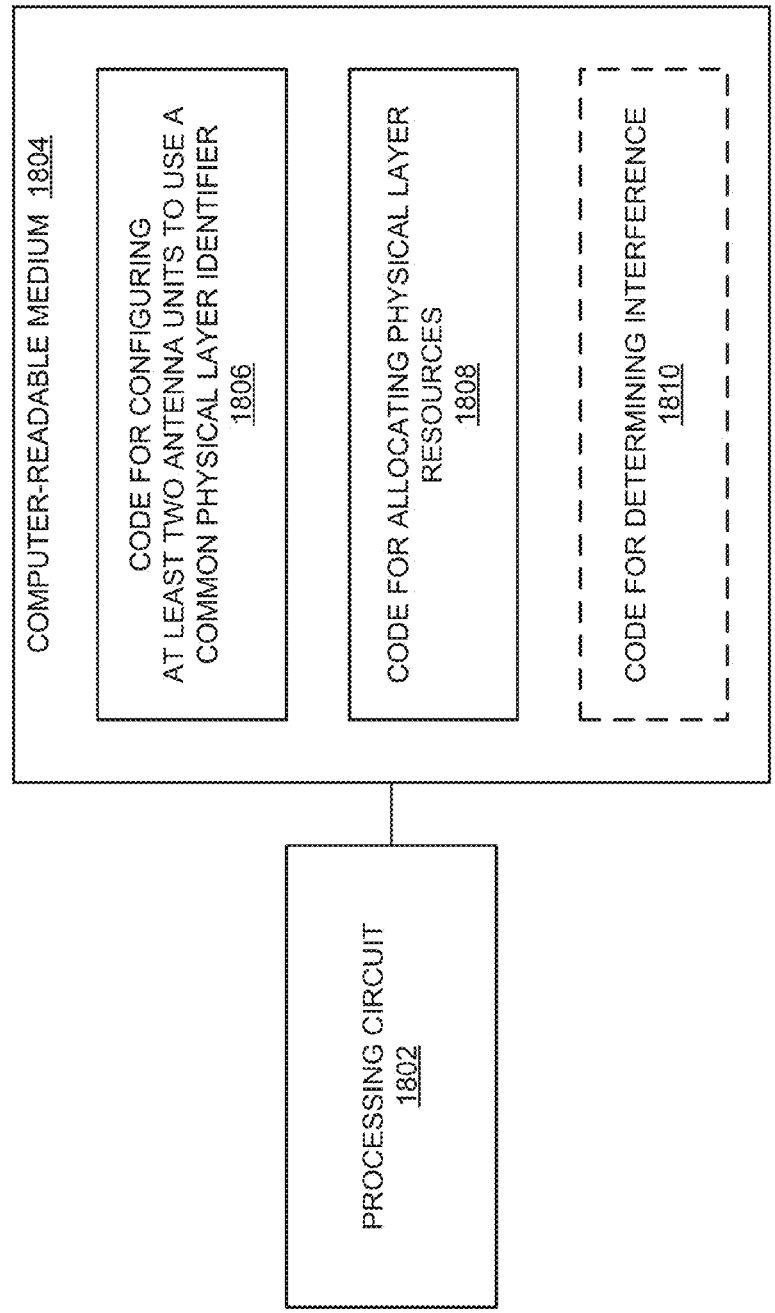

BASE STATION EMPLOYING SHARED RESOURCES AMONG ANTENNA UNITS

CROSS-REFERENCE TO RELATED APPLICATIONS

The present Application for Patent claims the benefit of U.S. Provisional Application No. 61/798,252, entitled "BASE STATION EMPLOYING SHARED RESOURCES AND SPLIT PHY," filed Mar. 15, 2013, assigned to the assignee hereof, and expressly incorporated herein by reference in its entirety.

BACKGROUND

This application relates generally to wireless communication and more specifically, but not exclusively, to sharing resources among different antenna units that use a common physical layer identifier.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s).

In some networks, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

Various types of low-power access points may be employed in a given network. For example, low-power access points may be implemented as or referred to as small cells, femto cells, femto access points, femto nodes, home NodeBs (HNBs), home eNodeBs (HeNBs), access point base stations, pico cells, pico nodes, or micro cells. For convenience, low-power access points may be referred to simply as small cells in the discussion that follows. Thus, it should be appreciated that any discussion related to small cells herein may be equally applicable to low-power access points in general (e.g., to femto cells, micro cells, pico cells, etc.).

Each access point (e.g., macro cell or small cell) in a network may be assigned a physical layer identifier that is used to identify the access point, at least on a local basis. For example, a physical layer identifier may comprise a primary scrambling code (PSC) in UMTS or a physical cell identifier (PCI) in LTE. Other types of physical layer identifiers may be used in other technologies.

Typically, a fixed quantity of physical layer identifiers is defined in a given network. Accordingly, in conventional network planning, a network operator carefully assigns physical layer identifiers to access points to avoid so-called collisions between the physical layer identifiers used by different access points.

Physical layer identifier collision involves a scenario where two or more access points within communications range of an access terminal broadcast reference signals (e.g., pilot signals or beacon signals) that are based on the same physical layer identifier. In this case, the access terminal may not be able to decode the signals since the signals are based on the same physical layer identifier. Such collisions may result in significant interference on a channel, thereby causing potential service disruptions.

Physical layer identifier collision is a common problem for small cells deployed in areas with a high density of users, buildings, conventions centers, or other high user density venues. This problem arises because the number of physical layer identifiers allocated for small cell deployments in such areas (e.g., within a given building) is typically restricted to 4-8 physical layer identifiers. However, a large number of small cells may need to be deployed within an area that has high user density (e.g., enterprise environments, shopping malls, apartment buildings, etc.) to provide enough capacity and/or coverage for users within that area. For example, some building deployments may require 6 to 8 small cells per floor depending on the user traffic profile. Given the restricted set of physical layer identifiers and the high small cell density requirements in some deployments, it may be challenging to avoid physical layer identifier collision when performing physical layer identifier planning. However, reusing the same physical layer identifier at close proximity (e.g., at a low path loss to another small cell reusing the same physical layer identifier) will lead to severe inter-small cell interference, adverse impact on uplink and/or downlink capacity, and adverse impact on user experience (e.g., calls dropped, low throughput, etc.).

Physical layer identifier collision may occur in different communication technologies that use different types of physical layer identifiers. For example, a primary scrambling code (PSC) is a type of physical layer identifier used in Universal Mobile Telecommunications System (UMTS). Thus, UMTS systems may suffer from PSC collision. Other technologies may suffer from other types of physical layer identifier collision. For purposes of illustration, the discussion that follows refers to PSC collision. It should be appreciated that this discussion may be equally applicable to other types of physical layer identifier collision.

An example of a PSC collision scenario for a network 100 that employs discrete HNBs is illustrated in FIG. 1. In this simplified example, the network 100 includes a first HNB 102A, a second HNB 102B, a third HNB 102C, and a fourth HNB 102D. Coverage areas of the first through fourth HNBs are represented by corresponding dashed ovals 104A, 104B, 104C, and 104D. As indicated in FIG. 1, in some cases the coverages of neighboring HNBs overlap.

An access terminal (AT) is able to receive service from a given HNB when the AT is within the coverage of that HNB. In the example of FIG. 1, a first access terminal 106A is within the coverage areas 104A and 104B, while a second access terminal 106B is within the coverage area 104C.

FIG. 1 also illustrates the physical layer identifier, specifically PSC, used by each HNB. The first HNB 102A uses PSC X, the second HNB 102B uses PSC X, the third HNB 102C uses PSC Y, and the fourth HNB 102D uses PSC Z. Accordingly, the first and second HNBs 104A and 104B use the same PSC. Consequently, PSC collision may occur in areas of the network 100 where the coverage of the first HNB 104A overlaps with the coverage of the second HNB 104B. Thus, at its current location, the first AT 106A may experience PSC collision.

To address such physical layer identifier (e.g., PSC) collision, a small cell distributed antenna system (small cell-DAS) may be employed. A small cell-DAS mitigates physical layer identifier collision by expanding the foot print of a small cell. Thus, a given geographical area can be covered using a smaller number of physical layer identifiers.

Accordingly, in environments with a high concentration of users, deployment of small cells coupled with DAS to cover a large floor space may be advantageous.

FIG. 2 illustrates an example of a HNB-DAS 200 that includes an expansion unit 202 with a first HNB 204A that uses PSC X and a second HNB 204B that uses PSC Y. Each HNB employs several remote antenna units (RAUs) to provide expanded cell coverage. Specifically, the first HNB 204A transmits radiofrequency (RF) signals based on the PSC X to each of a first RAU 206A, a second RAU 206B, and a third RAU 206C. Similarly, the second HNB 204B transmits RF signals based on the PSC Y to each of a fourth RAU 206D and a fifth RAU 206E. Each RAU, in turn, includes an RF amplifier (not shown) and at least one antenna (A) for transmitting these RF signals.

Respective coverage areas 208A, 208B, 208C, 208D, and 208E of the first through fifth RAUs 206A-206E are represented by dashed ovals. Thus, the first HNB 204A provides service over the coverage areas 208A, 208B, and 208C, while the second HNB 204B provides service over the coverage areas 208D and 208E. Accordingly, in comparison to the HNBs of FIG. 1, each HNB of FIG. 2 provides a larger coverage area.

Moreover, the PSC X is used in the coverage areas 208A, 208B, and 208C, while the PSC Y is used in the coverage areas 208D and 208E. Consequently, fewer PSCs need be deployed over a given geographical area in comparison to the HNB architecture of FIG. 1. Of note, there will not be PSC confusion between the coverage areas 208A-208C even though the same PSC is used in the coverage areas since these coverage areas are all associated with the first HNB 204A.

The use of a small cell-DAS may lead to certain inefficiencies relating to system capacity, however. In general, small cells have limited capacity in terms of the number of concurrent users supported. For example, some types of small cells may support a maximum of 15 simultaneous users. Such hardware limitations may reduce the usability of small cells in areas having a high concentration of users (e.g., enterprise buildings, shopping malls, hospitals, etc.). In particular, the limited user capacity of small cells may not match the air interface capacity of the wireless network. For example, the 3GPP UMTS standard specifies that the maximum number of users supported by an access point can be in excess of 60. Accordingly, the use of a small cell-DAS for serving a large building may result in insufficient user capacity in the uplink and/or the downlink.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to a distributed antenna architecture that employs a shared physical layer identifier (e.g., shared PSC) and a split physical layer (PHY). Advantageously, such an architecture may provide improved physical layer identifier collision (and/or confusion) mitigation as compared to conventional small cell deployments, while providing higher user capacity as compared to conventional small cell DAS deployments.

In a sample implementation, a base station includes a base unit and several remote antenna units (RAUs). In some aspects, the PHY layer of the Radio Access Network (e.g., UMTS) stack for the base station is split and distributed to each RAU, and each RAU uses the same physical layer identifier. The base unit, in turn, controls resource allocation for the antenna units.

Through the use of multiple RAUs, the base station provides a relatively large coverage area. In addition, by using the same physical layer identifier for each RAU, the physical layer identifier will have a relatively large coverage footprint. Consequently, in comparison to a conventional small cell architecture that uses discrete small cells (e.g., as in FIG. 1), fewer physical layer identifiers will be used in a given coverage area for a network that instead employs base stations constructed in accordance with the teachings herein. The likelihood of physical layer collision and/or confusion will thus be lower.

Moreover, by distributing the PHY to the RAUs, each RAU is able to support a higher user capacity as compared to an RAU of a conventional small cell DAS deployment. For example, a given PHY may include several hardware modulators and demodulators and thereby support traffic for a relatively large number of users.

The disclosed architecture is thus in contrast to a conventional HNB DAS architecture. In a conventional HNB DAS architecture in UMTS, a PHY is not located at any of the RAUs of a given HNB DAS. Rather, the PHY is co-located with the UMTS stack. The disclosed architecture also stands in contrast to a conventional discrete HNB architecture. In a distributed HNB architecture in UMTS, for example, each HNB includes a single UMTS stack and PHY.

The disclosure relates in some aspects to controlling resource allocation for the antenna units to provide increased capacity gain and mitigate interference. In various aspects, this resource allocation may involve reusing resources between RAUs or splitting resources between RAUs.

In a scenario where several RAUs are relatively far from one another, resources may be reused between the RAUs to improve the overall capacity of the network. For example, physical layer resources (e.g., downlink orthogonal variable spreading factor codes, uplink scrambling codes, or transmission time intervals) may be reused between different RAUs provided such reuse does not cause too much interference. Thus, multiple RAUs of a given base station may use the same resources in some cases.

In a scenario where several RAUs are relatively close to one another, resources may be split between the RAUs to mitigate interference that could otherwise exist at an access terminal that receives signals from both RAUs. For example, a first portion of the available physical layer resources may be allocated for one RAU and a second portion of the physical layer resources may be allocated for another RAU. In this way, signal transmissions by the RAUs are less likely to interfere with each other at nearby access terminals.

The disclosure also relates in some aspects to mobility management for access terminals being served by the distributed antenna architecture taught herein. In some aspects, each RAU autonomously performs mobility management to facilitate mobility of access terminals between RAUs. For example, a sensing algorithm may be employed on the uplink to sense access terminals that are moving from one RAU to another. Upon detection of such movement, physical resources at the RAUs may be reallocated to more effectively serve this access terminal and other access terminals in the network.

The teachings herein may be embodied and/or practiced in different ways in different implementations. Several examples follow.

In some aspects, an apparatus for communication in accordance with the teachings herein comprises: at least one base unit configured to allocate physical layer resources for the apparatus; and a plurality of antenna units communicatively coupled to the at least one base unit, wherein: the antenna units are physically separated, at least two of the antenna units are configured to use a common physical layer identifier on a common carrier frequency, and the allocation of the physical layer resources comprises dividing the physical layer resources among the antenna units to mitigate, within a geographical area, potential interference associated with signals from the antenna units.

In some aspects, in a method of communication in accordance with the teachings herein, where an apparatus comprises a plurality of antenna units communicatively coupled to at least one base unit and where the antenna units are physically separated, the method comprises: configuring at least two of the antenna units to use a common physical layer identifier on a common carrier frequency; and allocating physical layer resources for the apparatus, wherein the allocation of the physical layer resources comprises dividing the physical layer resources among the antenna units to mitigate, within a geographical area, potential interference associated with signals from the antenna units.

In some aspects, an apparatus for communication in accordance with the teachings herein comprises: a plurality of antenna units communicatively coupled to at least one base unit, wherein the antenna units are physically separated; means for configuring at least two of the antenna units to use a common physical layer identifier on a common carrier frequency; and means for allocating physical layer resources for the apparatus, wherein the allocation of the physical layer resources comprises dividing the physical layer resources among the antenna units to mitigate, within a geographical area, potential interference associated with signals from the antenna units.

In some aspects, in a computer-program product in accordance with the teachings herein, where an apparatus comprises a plurality of antenna units communicatively coupled to at least one base unit and where the antenna units are physically separated, the computer-program product comprises computer-readable medium comprising code for causing a computer to: configure at least two of the antenna units to use a common physical layer identifier on a common carrier frequency; and allocate physical layer resources for the apparatus, wherein the allocation of the physical layer resources comprises dividing the physical layer resources among the antenna units to mitigate, within a geographical area, potential interference associated with signals from the antenna units.

BRIEF DESCRIPTION OF THE DRAWINGS

These and other sample aspects of the disclosure will be described in the detailed description and the claims that follow, and in the accompanying drawings, wherein:

FIG. 18 is a simplified block diagram of several sample aspects of a processing circuit and a computer-readable medium that support a distributed antenna architecture.

Figure 1:
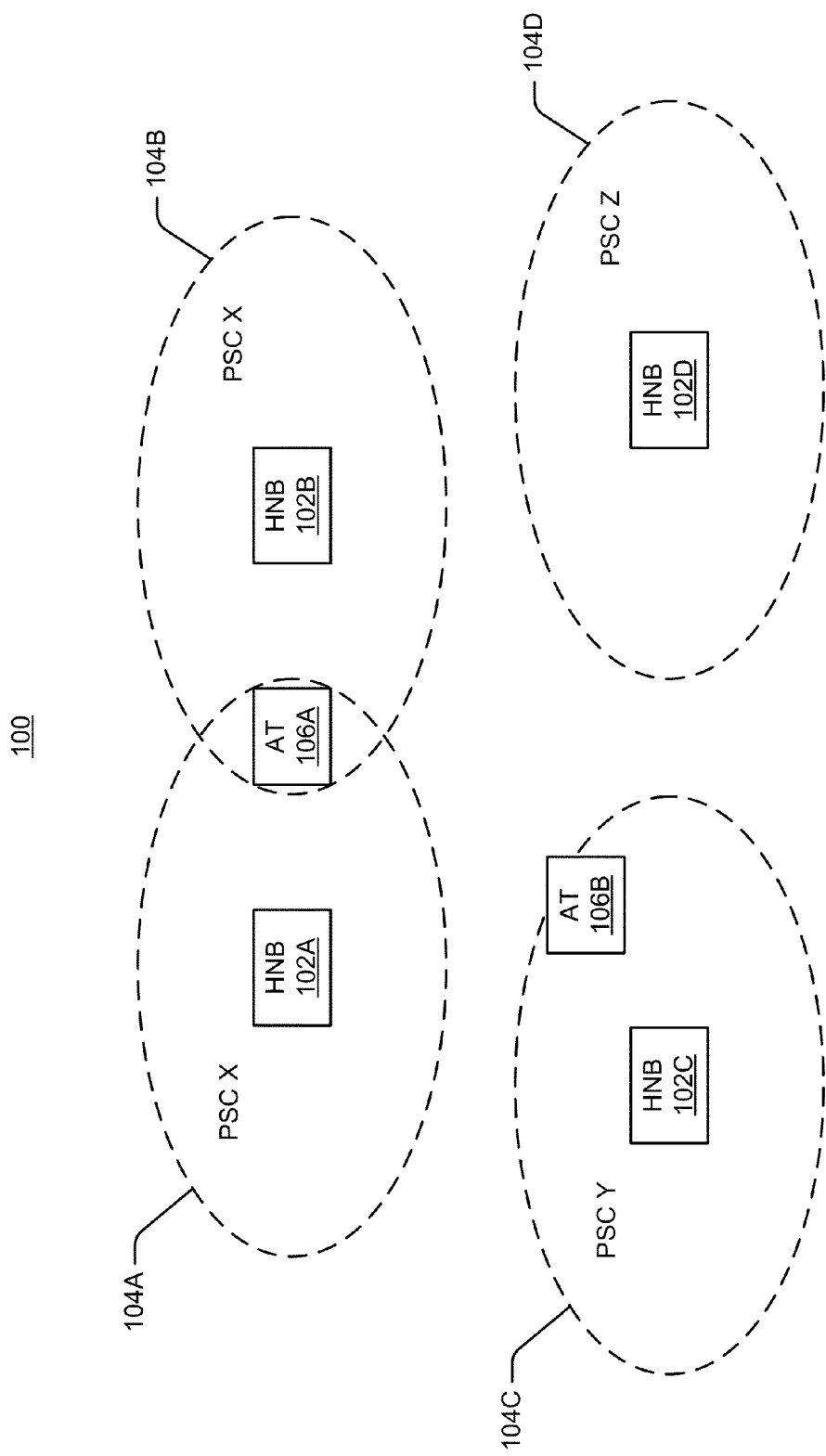
FIG. 1 is a simplified block diagram illustrating an example of physical layer identifier collision in a network.
Figure 2:
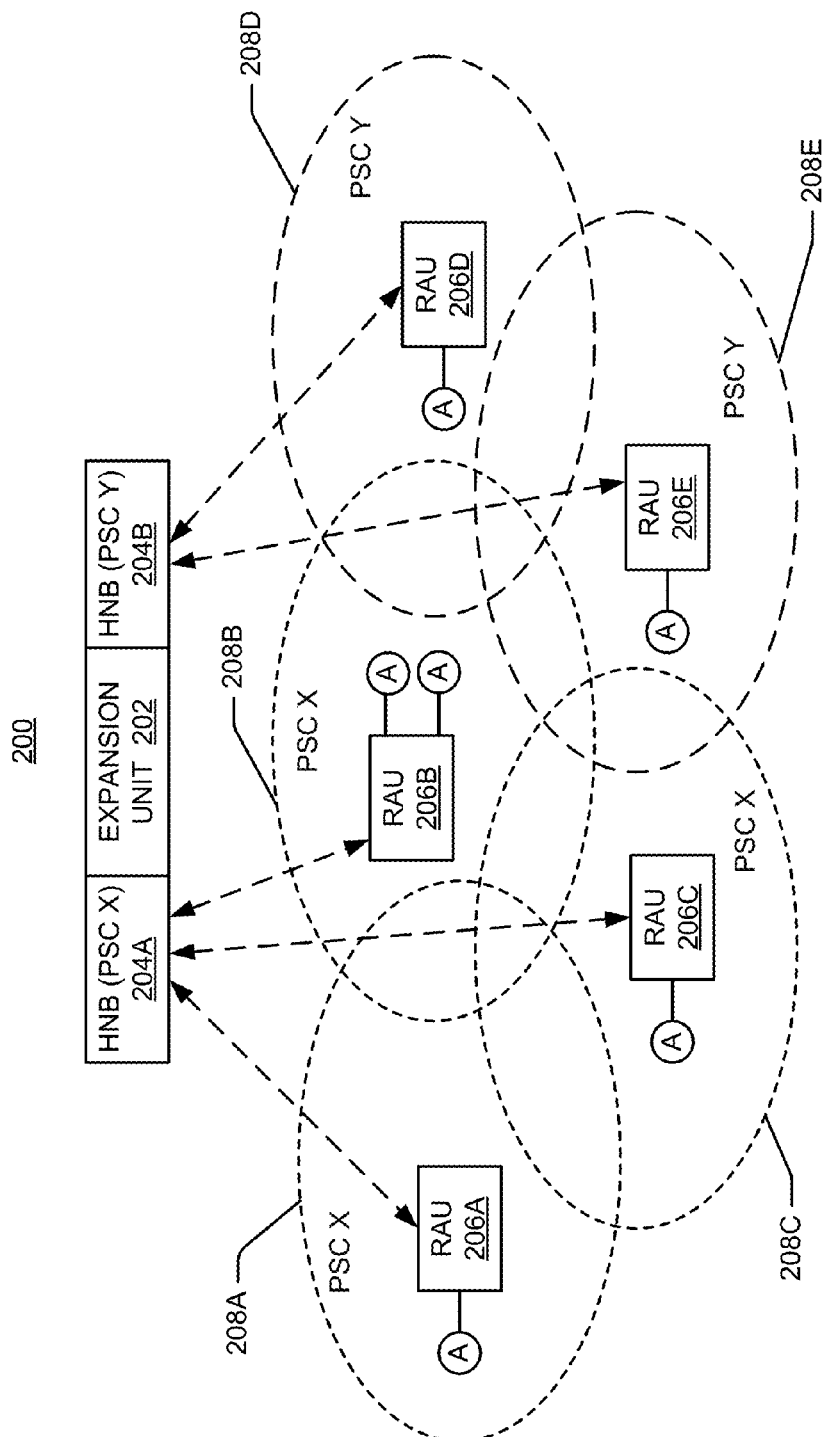
FIG. 2 is a simplified block diagram illustrating an example of a conventional Home Node B distributed antenna system (HNB-DAS)

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

A base station includes a base unit and a plurality of remote antenna units (RAUs), whereby each of the RAUs includes a physical layer circuit (PHY). The PHYs are configured to each use the same physical layer identifier. Thus, the base station provides a relatively large coverage area that is based on a single physical layer identifier. Each PHY also includes its own hardware for supporting users in the coverage area of that PHY. Consequently, the base station is able to provide relatively high capacity while reducing the likelihood of physical layer identifier collision and/or confusion in a network. The base unit controls resource allocation for the RAUs so that resources are dynamically reused or split between the PHYs to increase the capacity of the base station or reduce interference between PHYs depending on the relative proximity of the PHYs and the locations of users within the coverage of the base station.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim.

For illustration purposes, various aspects of the disclosure may be described in the context of a system where one or more access terminals, base stations, and network entities communicate with one another. It should be appreciated, however, that the teachings herein may be applicable to other types of apparatuses or other similar apparatuses that are referenced using other terminology. For example, in various implementations base stations may be referred to or implemented as access points, NodeBs, eNodeBs, femto cells, small cells and so on, while access terminals may be referred to or implemented as user equipment (UEs), mobile stations, and so on.

Base stations in the system provide access to one or more services (e.g., network connectivity) for one or more access terminals that may be installed within or that may roam throughout a coverage area of the system. Each of these base stations may communicate with one or more network entities to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two or more of these network entities may be co-located and/or two or more of these network entities may be distributed throughout a network.

Figure 3:
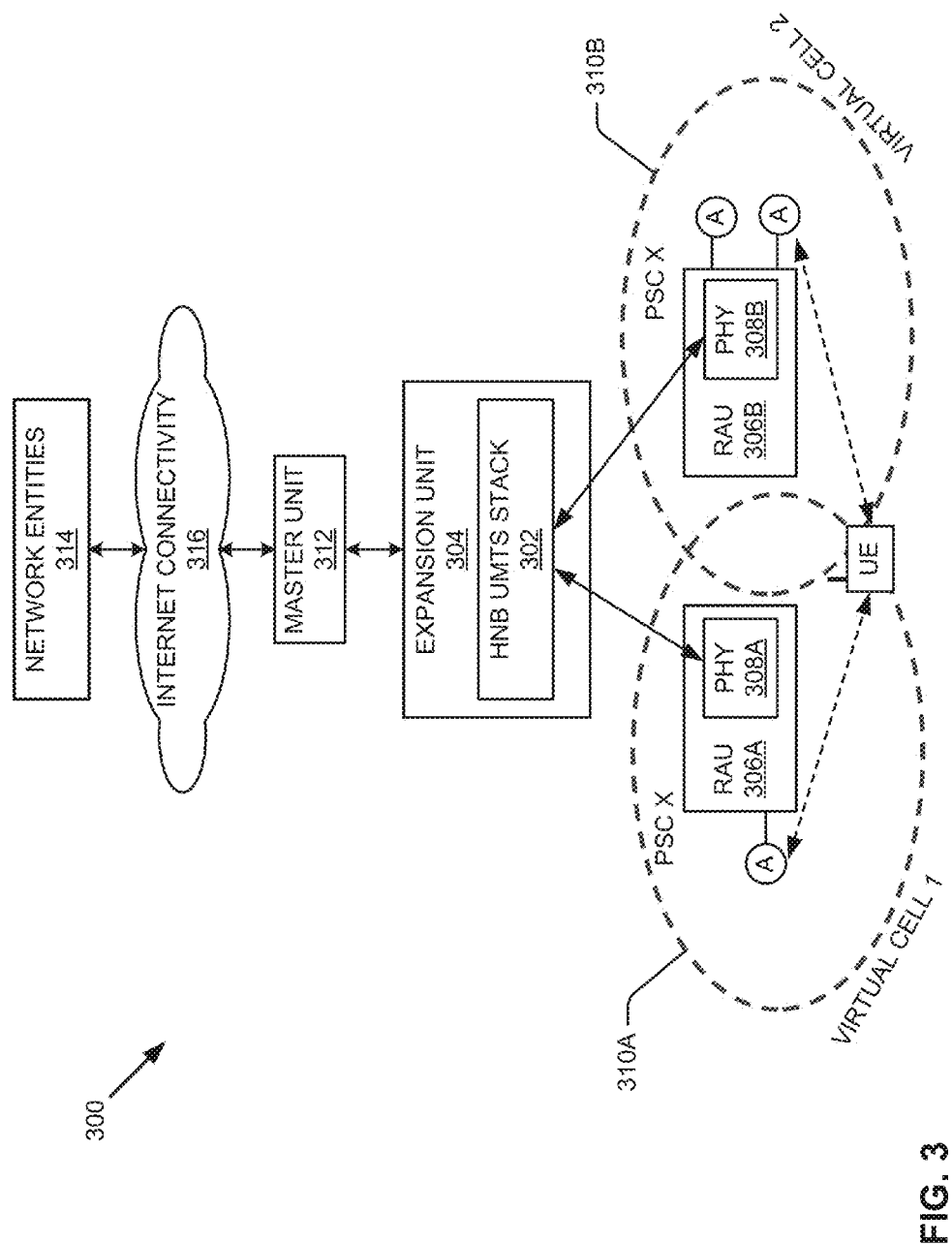
FIG. 3 is a simplified block diagram illustrating an example of a distributed antenna architecture and associated virtual cells.

FIG. 3 illustrates an example of a distributed antenna architecture 300. For purposes of illustration, the distributed antenna architecture 300 is described in the context of UMTS-based radio access technology. It should be appreciated, however, that the disclosed architecture may be applicable to other radio access technologies and frameworks as well. In particular, it will be appreciated that the techniques exemplified here in the context of a small cell distributed antenna framework can be applied to other frameworks to manage collision of physical cell identifiers, including macro cell deployments where the same physical cell identifier is broadcast across multiple antennas potentially using different output powers.

In the distributed antenna architecture 300, HNB functionality is split between two different types of entities. HNB UMTS stack 302 functionality is implemented in an expansion unit 304 while HNB Layer 1 functionality is implemented in a first RAU 306A and a second RAU 306B. The first RAU 306A includes a first PHY 308A and the second RAU 306B includes a second PHY 308B.

The HNB UMTS stack 302 provides functionality relating to allocating resources for the PHYs 308A and 308B. For example, the HNB UMTS stack 302 may provide Radio Resource Management (RRM), scheduling, signaling, and control functions (Layer 2 and upwards). In some aspects, RRM done at the HNB UMTS stack 302 may involve handling collisions and mobility.

The PHYs 308A and 308B provide Layer 1 functionality as well as autonomous mobility management between the PHYs 308A and 308B. As discussed herein, each of the PHYs 308A and 308B use the same PSC. Thus, the architecture 300 may be referred to herein as a shared PSC-split PHY architecture.

Each RAU includes one or more antennas (represented by the circles A). In the example of FIG. 3, the RAU 306A includes a single antenna and the RAU 306B includes two antennas.

The RF signal coverage of the first RAU 306A and the second RAU 306B is represented in a simplified manner by a first dashed oval 310A and a second dashed oval 310B. As discussed in more detail below, in the shared PSC-split PHY scheme, the coverage region served by a given RAU (PHY) is referred to as a virtual cell (VC). Thus, each RAU is associated with a virtual cell. In the example of FIG. 3, the RAU 306A corresponds to virtual cell 1 and the RAU 306B corresponds to virtual cell 2.

As indicated, each virtual cell is associated with the same PSC, designated PSC X. Thus, a UE within the coverage of either of these virtual cells will effectively "see" a single cell that has the combined coverage of virtual cell 1 and virtual cell 2.

A shared PSC-split PHY scheme as taught herein addresses problems associated with limited user capacity and PSC planning by allowing multiple physical layer entities (PHYs) to work in a coordinated manner on a single (shared) PSC. In the example of FIG. 3, the PHY layer of a HNB UMTS stack has effectively been split and distributed to each RAU. The rest of the UMTS stack is housed in a centralized location (the expansion unit 304). By pushing the PHY layer to the remote antenna locations, the shared PSC-split PHY architecture is able to better match the chipset capacity with the UMTS air interface user capacity.

In various aspects, the disclosed shared PSC-split PHY scheme may involve sharing the physical layer resources between PHYs, reusing physical layer resources, coordinating physical resource allocation and usage, autonomous mobility management, or any combination of these functions.

The sharing of physical layer resources may involve, for example, sharing downlink Orthogonal Variable Spreading Factor (DL-OVSF) codes, sharing DL Transmission Time Intervals (TTIs), or sharing uplink (UL) long codes between multiple entities. In addition to these physical layer resource allocation operations, the transmit power for each RAU may be managed to improve system performance (e.g., to increase capacity and decrease interference). Thus, in some aspects, managing of a distributed antenna system may involve physical layer resource allocation and/or transmit power control.

Physical layer resources may be reused, for example, in deployments where transmissions from different virtual cells do not interfere with one another (e.g., at a nearby access terminal). In such a case, the same physical layer resource may be allocated to two different virtual cells. Thus, a significant increase in capacity may be achieved, while still avoiding physical layer identifier collisions.

As a specific example, physical layer resources such as DL-OVSF codes may be reused between access terminals under the coverage of different virtual cells provided they do not cause much interference to one another. If there is a sufficiently large path loss between two PHYs, simultaneous DL-OVSF code tree reuse may be employed for the virtual cells associated with the PHYs.

Physical resource allocation and usage by the PHYs may be coordinated through the use of a central unit. For convenience, this central unit may simply be referred to as the UMTS stack. It should be appreciated, however, that this coordination may be provided by a different entity or function in different technologies.

Autonomous mobility management facilitates seamless transfer of an access terminal (e.g., UE) that moves between different PHYs. As discussed in more detail below, in some implementations, this involves the use of a UE-virtual cell association sensing algorithm on the UL.

Various advantages and/or benefits may be achieved through the use of a shared PSC-split PHY scheme as taught herein. For example, PSC planning effort may be reduced since the footprint of a small cell is effectively increased. Advantageously, this increase is footprint can be achieved without losing out on user capacity. Also, since the footprint of a small cell is effectively increased, physical layer identifier collision (or confusion) in a dense-user small cell deployment scenario may be mitigated. The use of the split PHY can result in an increase in UL and DL user capacity by making better use of the air-interface capacity. Benefits from diversity gain and capacity increase also may be obtained as a result of a reduction in other user interference (e.g., through the use of orthogonal codes over a larger area). Additional capacity benefits may be obtained as a result of reduced inter-cell interference due to sharing of the OVSF code space over a larger area. Macro diversity benefits can be achieved on the DL as a result of distributing the PHYs (e.g., resulting in better Ec/Io). Selection diversity benefits on the UL also may be achieved due to the distributing of the PHYs. Reduced call drop events may be experienced due to a reduction in interference (e.g., as discussed above). Moreover, the scheme may be transparent to an access terminal and, hence, may be backward compatible with legacy access terminals (e.g., older 3GPP UMTS release UEs).

In view of the above, a common PSC may be used among multiple cells (PHYs) to cover a larger area. Advantageously, a conventional, limited capacity HNB (e.g., maximum of 15 simultaneous users) may be deployed at each PHY to emulate a HNB with larger capacity (e.g., a capacity of 15× the number of PHYs). Thus, the HNB chipset capacity may be better matched with the air interface capacity.

A system employing shared PSC-split PHY may provide advantages over systems that locate the stack in a different location. For example, a shared PSC-split PHY implementation (e.g., HNB stack and PHY split between EU and RAU) may provide much better capacity than a small cell-DAS implementation (e.g., HNB stack (UMTS stack and PHY) entirely at the EU). Also, while a discrete small cell radio implementation (e.g., HNB stack, PHY, and antennas within a single housing) may theoretically provide higher capacity (assuming zero collisions) than a shared PSC-split PHY implementation, this higher capacity might not be achievable in practice due to the likelihood of collisions in high density scenarios.

In the discussions that follow, the expansion unit 304, the RAUs 306A and 306B, along with a master unit 312 of FIG. 3 may be referred to as a base station since, collectively, these components provide base station functionality. The master unit 312 provides other base station-related functionality including, for example, communicating with network entities 314 via Internet connectivity 316 or some other suitable connection. The Internet connectivity 316 may comprise, for example, a digital subscriber line (DSL) modem, a cable modem, or some other type of modem.

Figure 4:
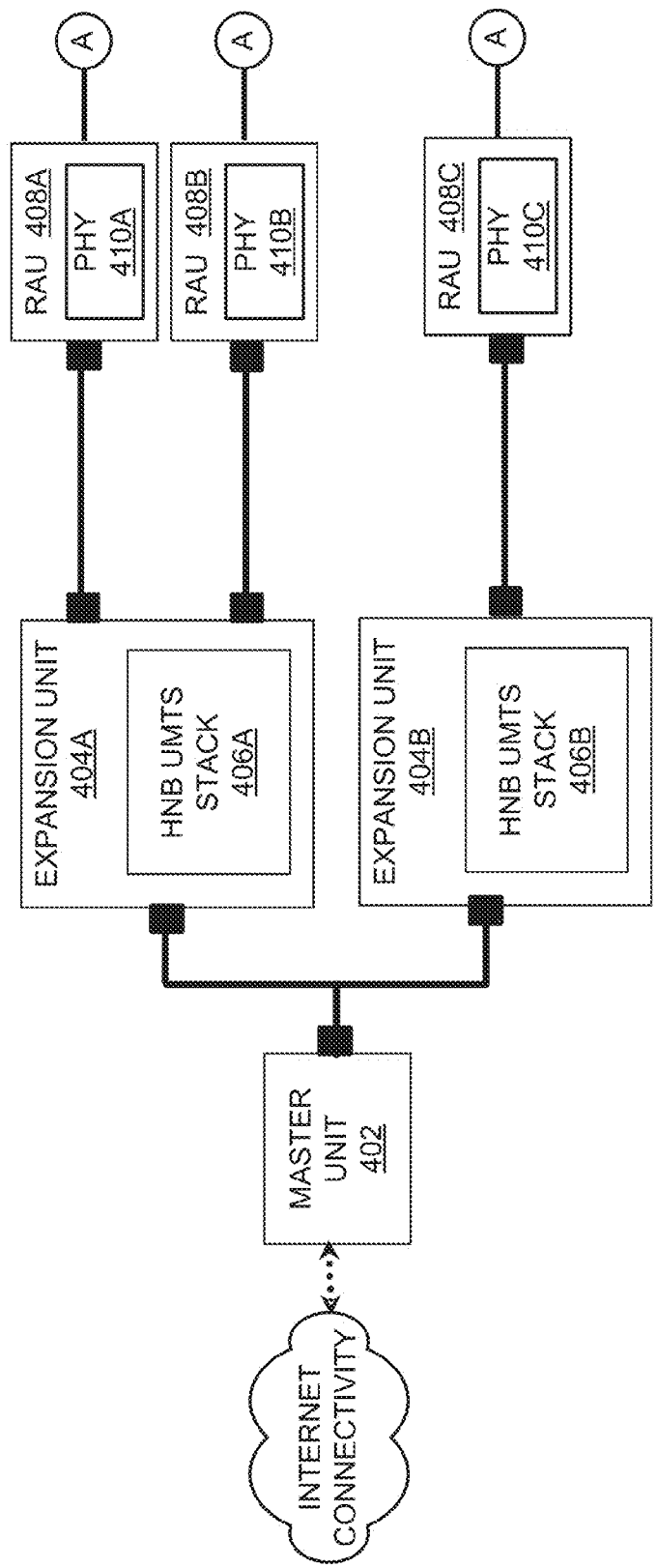
FIG. 4 is a simplified diagram illustrating an example of a distributed antenna architecture.

In different implementations, a base station as taught herein may include different combinations of the components depicted in FIG. 3. FIG. 4 illustrates an implementation that includes multiple expansion units, each of which may be coupled to one or more RAUs.

A master unit 402 is communicatively coupled to a first expansion unit 404A and a second expansion unit 404B. The first expansion unit 404A includes a first portion of the UMTS stack 406A and the second expansion unit 404B includes a second portion of the UMTS stack 406B.

As shown in FIG. 4, one or more PHYs may be communicatively coupled to a single UMTS stack. The first expansion unit 404A is communicatively coupled to a first RAU 408A and a second RAU 408B. The second expansion unit 404B is communicatively coupled to a third RAU 408C. The first RAU 408A includes a first PHY 410A, the second RAU 408B includes a second PHY 408B, and the third RAU 408C includes a third PHY 410C.

The interface between a UMTS stack and a PHY may, for instance, be akin to a Universal Terrestrial Radio Access Network (UTRAN) Iub interface. Thus, for high-speed downlink packet access (HSDPA) channels, a PHY, for instance, could handle some media access control (MAC) processing (e.g., MAC-e/hs).

Figure 5:
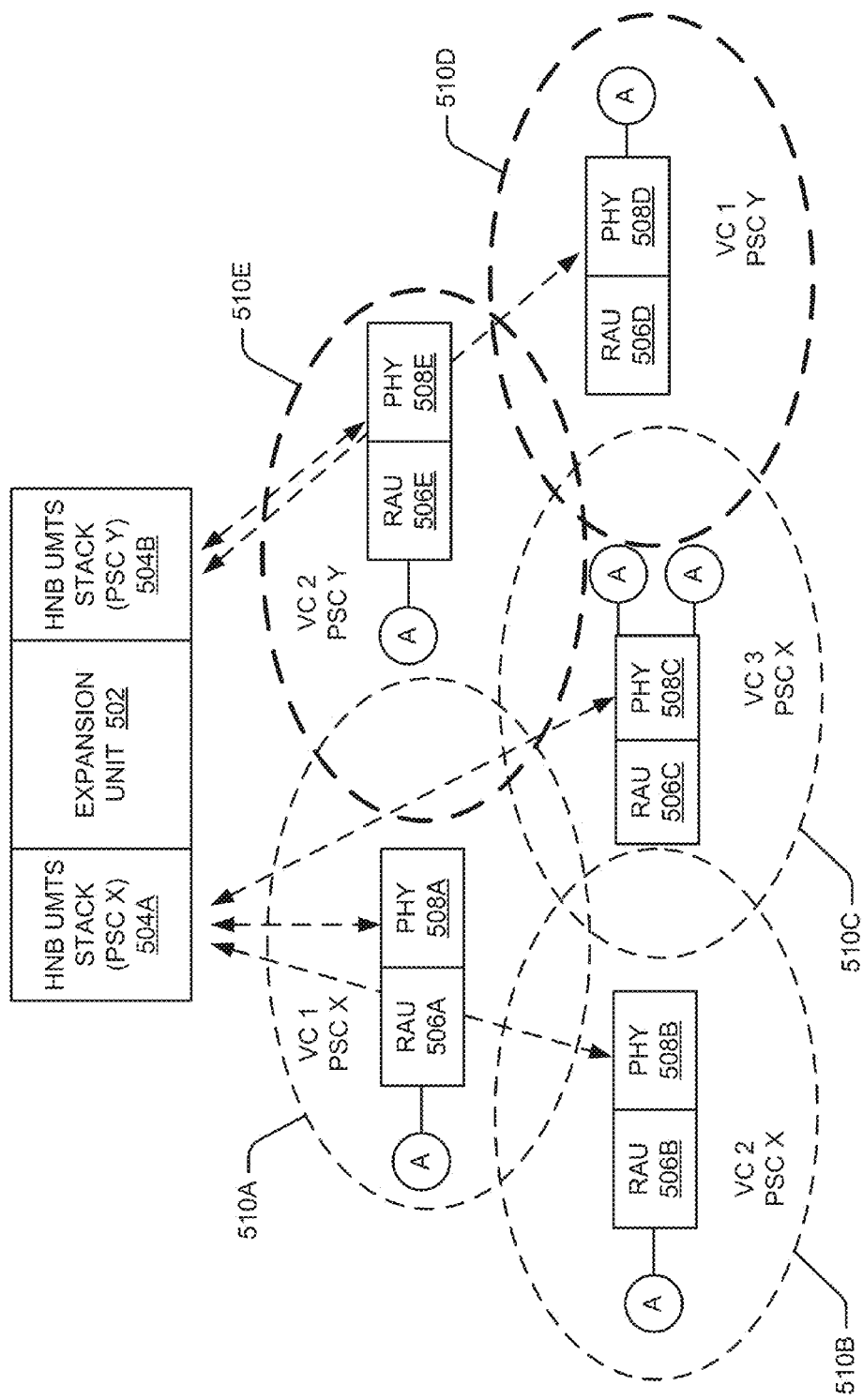
FIG. 5 is a simplified diagram illustrating an example of a distributed antenna architecture.

FIG. 5 illustrates another example of a shared PSC-split PHY architecture in accordance with the teachings herein. In this case, an expansion unit 502 includes a first HNB UMTS stack 504A and a second HNB UMTS stack 504B. Moreover, the first HNB UMTS stack 504A uses one PSC (PSC X) while the second HNB UMTS stack 504B uses another PSC (PSC Y). This figure illustrates that coverage may be provided over a very wide area and with high capacity by employing the shared PSC-split PHY scheme among a set of base stations.

FIG. 5 also illustrates that a given base station (e.g., HNB) may be associated with a virtual cell (VC) cluster that comprises a group of virtual cells served by the base station. In this example, each UMTS stack is associated with several RAUs (and, hence, PHYs). As mentioned above, a virtual cell is associated with each RAU (or PHY).

Thus, in FIG. 5, the UMTS stack 504A is connected to three RAUs 506A-506C comprising three PHYs 508A-508C. The UMTS stack 504A is thereby associated with the three virtual cells VC1-VC3 corresponding to coverage areas 510A-510C, where each of these virtual cells uses the same PSC X.

Similarly, in FIG. 5, the UMTS stack 504B is connected to two RAUs 506D-506E comprising two PHYs 508D-508E. The UMTS stack 504B is thereby associated with the two virtual cells VC1-VC2 corresponding to coverage areas 510D-510E, where each of these virtual cells uses the same PSC Y.

Accordingly, a PHY may effectively be distributed for virtual cell in a virtual cell cluster. In addition, the same PSC may be shared among PHYs in one virtual cell cluster (e.g., controlled by a single HNB). The rest of the HNB UMTS stack (the common UMTS stack) is then implemented at a centralized location. This approach may thus be readily incorporated into a small cell distributed antenna setting where the UMTS stack can be located in a centralized location such as an expansion unit.

Furthermore, clusters of clusters may be formed whereby different virtual cell clusters may use different PSCs. For example, as shown in FIG. 5, a first set of virtual cells under a first HNB may use one PSC (PSC X), while another set of virtual cells under a second HNB may use another PSC (PSC Y).

Figure 6:
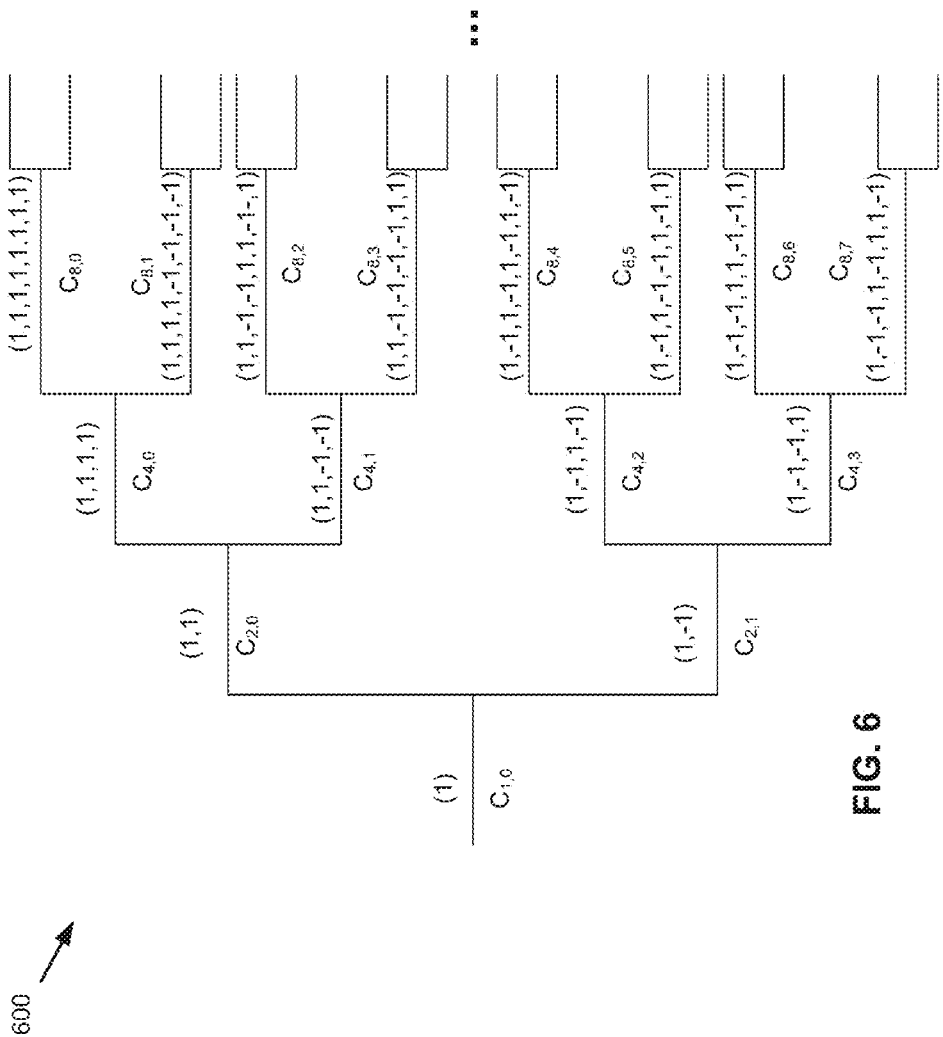
FIG. 6 is a simplified diagram illustrating an example of a code tree.

In some aspects, a shared PSC-split PHY scheme involves sharing the same PSC between multiple virtual cells, while partitioning (e.g., orthogonalizing) the physical resources between the virtual cells. FIG. 6 illustrates an example of an OVSF code tree 600 for a shared PSC-split PHY architecture (e.g., for a given PSC). In this example, $C_{x,y}$ denotes a specific spreading code sequence from the OVSF code tree 600, x denotes the spreading factor which is always a power of 2, and y denotes the code index at that spreading factor. The individual elements (the 1s and −1s) of the code sequence are bits/chips used to spread the information/data bits (e.g., as is done in CDMA technologies).

In some implementations, a first subset of the codes is shared, while a second subset of the codes is not shared. For example, a first partition of the code tree 600 may form a shared pool of codes (e.g., DL-OVSF codes) across virtual cells to transmit different information to multiple users, while a second smaller partition of the code tree (e.g., codes used for the broadcast channel (BCH) or the common channel (CCH)) is reused across cells to transmit the same broadcast and/or control information. Thus, the second subset of codes may comprise common channel (CCH) OVSF codes and forward access channel (FACH) OVSF codes that might not be shared. Conversely, the first subset of codes may comprise a shared pool of orthogonal codes defined for the DL.

The use of such a DL orthogonal-resources approach may advantageously avoid same-PSC interference to UEs at the "border" of virtual cells in a cluster. In some implementations, resource (e.g., DL OVSF) separation between virtual cells for PHY channels may be used in a dedicated fashion.

In view of the above, in some scenarios, increased network performance may be achieved when neighbor virtual cells employ fully orthogonal coloring of user OVSF codes or other resources.

In practice, however, peak and/or average downlink throughput per user may be reduced because of OVSF code space sharing. Here, a tradeoff between PSC collision mitigation and downlink throughput reduction may, in some aspects, depend on the number of deployed virtual cells and HNBs.

In accordance with the teachings herein, full orthogonalization may not be used in all cases. For a single-PSC deployment, the lack of need for full orthogonalization may enable cell capacity enhancement. For example, even if an inefficient, static, equal, five-way orthogonalization is used to cover all neighborhood conditions, twice the capacity may be obtained with ten virtual cells.

Accordingly, in some scenarios, resources may be reused rather than orthogonalized between virtual cells. For example, the OVSF code space under a PSC may be reused fully to get additional capacity gains based on user geometry estimates (e.g., from UL sensing). For instance, if the user geometry is such that the users are close to their respective cell centers or on the cell edge farther away from each other, the transmit power on the PHYs may be adjusted accordingly and the entire OVSF code space reused with the same PSC. There may be a rate benefit from using more codes (e.g., by managing the capacity-interference trade-off using transmit power adjustment and code-space partitioning). A fraction of resources may be allocated as "shared" for border UEs in the intersection of multiple virtual cells and for hand-in purposes.

Since full resource orthogonalization (e.g., DL-OVSF partitioning) is not required within a virtual cell cluster in all cases, this orthogonalization may be invoked selectively (e.g., dynamically) under certain circumstances. For example, orthogonalization may only be invoked when an access terminal is at the border of two virtual cells in a cluster. As another example, if certain areas, virtual cells, or border regions have more UEs, more orthogonal resources may be allocated to them. Various triggers for orthogonalization may be employed.

In some cases, an orthogonalization trigger is based on UL sensing. For example, a trigger may be based on absolute or relative threshold comparison at virtual cluster members. When different virtual cells have different transmit powers, UEs can be aimed for higher UL rise-over-thermal (RoT) than strictly to overcome pathloss (e.g., to ease detection at neighboring cells in the same VC cluster).

In some cases, an orthogonalization trigger is based on channel quality indicator (CQI) feedback. For example, if CQI degrades, orthogonalization may be triggered.

In some cases, an orthogonalization trigger is based on common pilot channel received signal code power (CPICH RSCP) feedback. This information may be obtained, for example, from measurement report messages.

In some cases, an orthogonalization trigger is based on CPICH Echo feedback. This information may be obtained, for example, from measurement report messages.

Also, other UE-based mechanisms may be employed whereby a UE can detect a cell-specific beacon and report either a beacon measurement or require a switch in the controlling virtual cell. Such a beacon can be a Layer 1 beacon or a higher layer beacon.

Various types of orthogonalization mechanisms may be employed. For example, orthogonalization may be requested via RRC commands (e.g., PCR, ASU) or via HS-SCCH assignment to HS-PDSCH codes.

Figure 7:
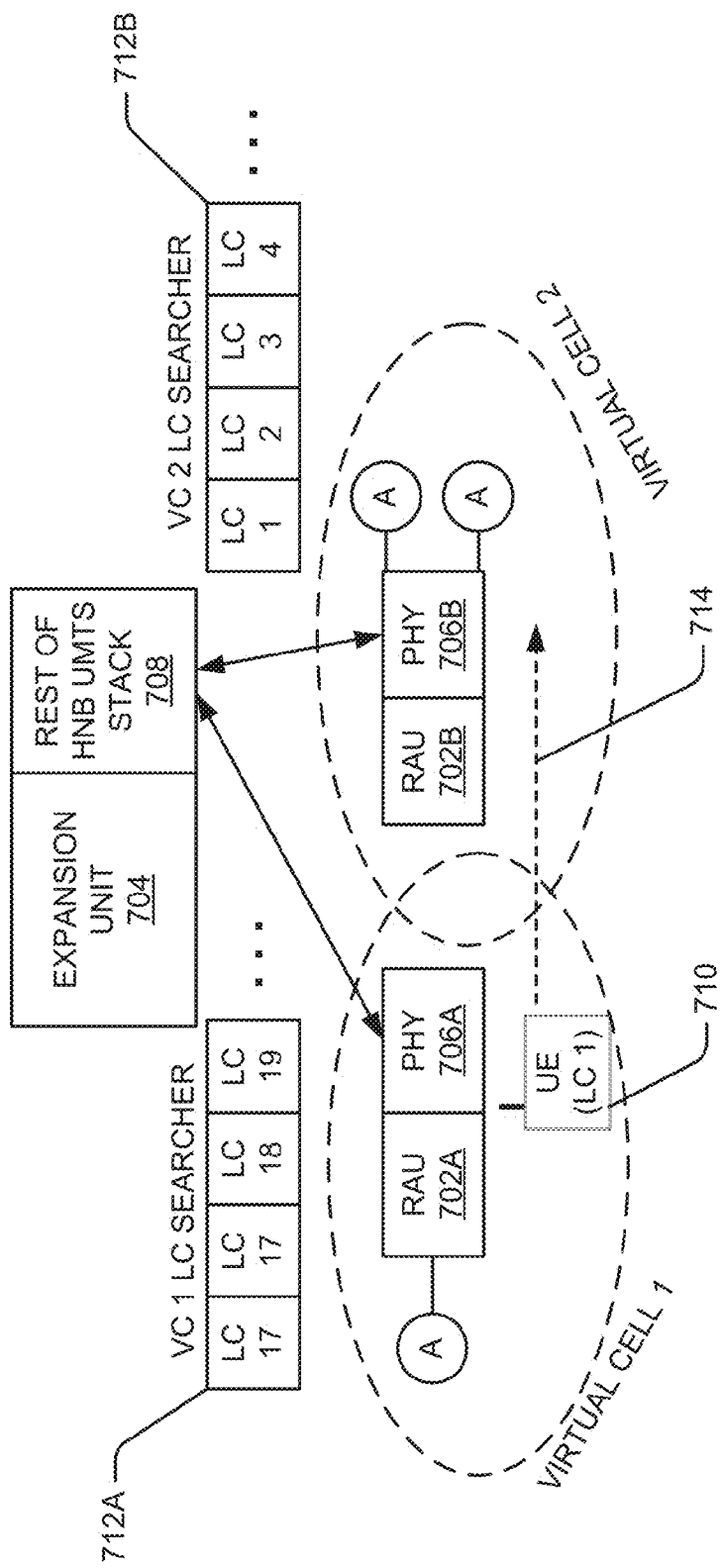
FIG. 7 is a simplified diagram illustrating an example of mobility management in a distributed antenna architecture.

Referring now to FIG. 7, autonomous mobility management may be advantageously employed in conjunction with a shared PSC-split PHY scheme. Such a mobility management scheme may be used, for example, to simplify the RRM within the different PHYs connected to a UMTS stack. Here, the same RRM is provided to all PHYs by the UMTS stack.

Similar to the base stations described above, in FIG. 7, a first RAU 702A and a second RAU 702B are coupled to an expansion unit 704. The first RAU 702A includes a first PHY 706A and the second RAU 702B includes a second PHY 706B. The first RAU 702A is associated with first virtual cell (VC 1) and the second RAU 702B is associated with a second virtual cell (VC 2). As discussed herein, the physical layer portion of the UMTS stack resides at the PHYs 706A and 706B, while the rest of the UMST stack 708 resides at the expansion unit 704.

Each PHY assigns one of its demodulators for demodulating a received uplink signal (e.g., a long code from a UE 710) based on in-sync and out-sync conditions. In some aspects, the in-sync and out-sync conditions may relate to whether the UE 710 is synchronized with a specific virtual cell. Each virtual cell (e.g., each PHY) uses a fixed set of long codes (LCs) for UEs in its coverage region (e.g., 15 LCs). UEs are assigned demodulators on the UL (and modulators on the DL) based on the in-sync or out-sync response monitored through UL sensing. In some implementations, a single searcher may be time-shared between all out-sync users to sense the pilot energy on the DPCCH channel (e.g., the searcher senses a complementary set of long codes). In other words, a periodic hopping long code searcher may be employed on the UL to search for long codes used by UEs in the other PHYs in the virtual cell cluster (e.g., to search for the UEs that are under the other VCs). In the example of FIG. 7, a first LC searcher 712A is used in the first virtual cell VC 1 and a second LC searcher 712B is used in the second virtual cell VC 2. In addition, the UE 710 uses LC 1 while in the first virtual cell VC 1.

Figure 8:
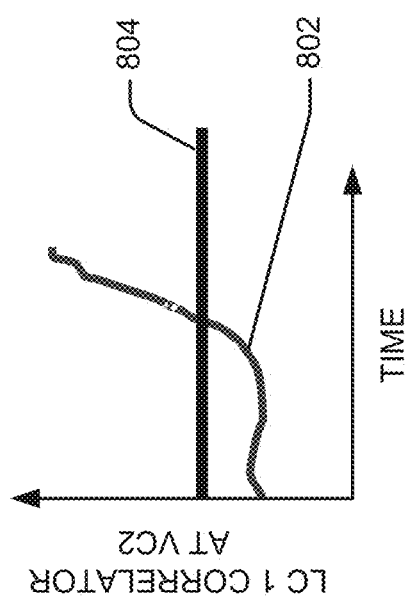
FIG. 8 is a simplified graph illustrating an example of long code detection.

A dedicated demodulator is assigned to an out-sync user when the pilot energy sensed crosses a predefined threshold (e.g., due to mobility of the UE 710). An example of such a threshold is shown in FIG. 8. Here, the graph 802 indicates sensing of UE energy over time on the UL channel as performed by a correlator (operating on LC 1) at the second virtual cell VC 2. The horizontal line 804 represents a virtual soft handover (SHO) threshold. Thus, when the sensed energy exceeds the threshold, the UE 710 is deemed to have moved close enough to the second virtual cell VC 2 to invoke handover of the UE 710 from the first virtual cell VC 1 to the second virtual cell VC 2.

To facilitate this handover, an entity controlling the handover may prepare the second virtual cell VC 2 with the configuration of the UE 710 to enable the second virtual cell VC 2 to serve the UE 710 as soon as the UE 710 is handed-over. Such an entity may comprise, for example, a NodeB, a HNB, an RAU, or some other suitable entity.

With reference to FIG. 7, an example of such a mobility operation will now be described in more detail. Initially, the second virtual cell VC 2 monitors for LC 1-15 (e.g., the LCs used by UEs in the first virtual cell VC 1). For example, the second virtual cell VC 2 may determine whether a soft handover threshold has been crossed (e.g., as in FIG. 8). As represented by the dashed arrow 714 in FIG. 7, at some point in time, the UE 710 using LC 1 moves from the first virtual cell VC 1 to the second virtual cell VC 2. As a result, upon monitoring for LC 1, the second virtual cell VC 2 will successfully demodulate LC 1. In addition, the first virtual cell VC 1 will release LC 1 (e.g., upon determining that LC 1 is no longer being successfully demodulated). The second virtual cell VC 2 reconfigures (via PCR) the UE using LC 1 to any available long code in its fixed set (LC 16-30).

In another example (not shown), the sets of long codes for each virtual cell may change at UE mobility. For example, the UE 710 may keep using LC1 after mobility to the second virtual cell VC 2, in which case the second virtual cell VC 2 will add LC1 to its list of long codes to demodulate while the first virtual cell VC 1 will move LC1 to the list of codes to monitor. In addition, the second virtual cell VC 2 will no longer monitor for LC 1 as an out-of-sync user.

In view of the above, in some aspects, mobility operations may involve associating UEs to virtual cells based on UL sensing. This may involve, for example, periodic hopping of a long code searcher and managing intra-cluster mobility by performing a Physical Channel Reconfiguration (PCR).

Also, a DL OVSF code may be switched based on the UL in-sync or out-sync status. This may be done, for example, to minimize power and other user interference (e.g., due to channel orthogonality loss factor). In this way, intra-virtual cell mobility may be more effectively managed.

In addition, each PHY may assign DL or UL resources to an antenna unit (e.g., OVSF codes) based on the pilot energy on the DPCCH channel, the decoding rate of particular channels (e.g., uplink dedicated physical channel (UL-DPCH), high speed dedicated physical control channel (HS-DPCCH), enhanced dedicated channel (E-DCH), enhanced dedicated physical data channel (E-DPDCH), or enhanced dedicated physical control channel (E-DPCCH)) decoded from the antenna unit, or a combination of these factors.

For purposes of illustration, several examples relating to how mobility management may be implemented in a UMTS system follow.

Initially, idle-mode mobility will be treated. For RRC_IDLE and associated signaling (LAU, RAU) no cell reselection is required between virtual cells in some aspects. In addition, conventional cell reselection procedures may be used between VC clusters using different PSCs.

Next, connected-mode mobility will be treated. For CELL_DCH Intra-VC mobility, a Virtual Active Set Update (ASU) may be triggered based on UL sensing the in-sync and out-sync response which may lead to virtual hard handover/soft handover (HHO/SHO) which may, in turn, lead to LC reconfiguration.

For CELL_DCH Inter-VC cluster mobility, allocating (Channel Code, LC) leads to simulcast in all VCs (virtual SHO), which may lead to in-sync and out-sync response, concluding with LC reconfiguration (conventional inter-small cell HHO between VC clusters). In some implementations, simulcast can be limited to the dedicated power control commands (e.g., for HSDPA configurations).

Referring now to CELL_FACH, CELL_PCH, and URA_PCH, there is no cell reselection required between virtual cells in some aspects. Also, conventional cell reselection and associated procedures (CU, URAU etc.) may be employed between VC clusters using different PSCs.

In various aspects, mobility management in accordance with the teachings herein may involve switching between virtual cells in same cluster based on in-sync and out-of-sync indications, switching between virtual cells in other clusters based on simulcasting and virtual SHO, simulcasting (and no orthogonalization) needed for non-CELL-DCH states, or performing some combination of these operations.

Various other considerations may be taken into account in conjunction with deploying a distributed antenna system in accordance with the teachings herein.

In some aspects, there may be differences between UL operation and DL operation. For DL Traffic, a PHY currently serving a UE (on the UL) transmits DL dedicated traffic. In addition, non-serving PHYs can optionally transmit dedicated DL traffic channels (for example, if there is no HSPA user). Thus, there may be macro diversity gains (e.g., better Ec/Io).

For UL Traffic, a PHY that senses a UE on its VC demodulates UE traffic on the UL (making sure at least one PHY is serving the UE). If there is no co-operation, multiple PHYs may demodulate the UE's data. A HNB can indicate to free up channel elements. With co-operation, other PHYs can optionally demodulate the UL (for example, if there are unused channel elements). Thus, there may be selection diversity gains on the UL.

As mentioned above, over the air (OTA) time synchronization may be employed between virtual cells. For example, OTA time delay difference $\Delta T_{OTA} \lessapprox 80$ microseconds may appear as multipath. Accordingly, time synchronization may be employed to ensure that virtual cells have relatively close timing.

Common DL channels (e.g., BCH, PCH, FACH) may be handled in various ways. BCH, PCH, and FACH may be simulcast in all VCs. Fixed channelization codes are employed for common control channels (e.g., BCH, PCH). FACH may be scheduled at the MAC layer and multiplexed on S-CCPCH.

A home UE's (HUE's) virtual cell location may be identified in various ways. Efficient UL sensing algorithm based on LC partitioning and complementary sensing against a HUE association threshold may be employed. Also, an accurate threshold may be established such that there is no UE without a serving PHY on the UL.

High speed uplink packet access (HSUPA) scheduling may be handled in various ways. Scheduling may be done at the UMTS entity, but based on PHY RoT threshold. This may lead to suboptimal scheduling as the scheduler may react to the maximum RoT, not to individual RoT measured at the PHY. Alternatively, an RoT may be maintained at each enhanced-PHY (PHY+MAC-e/hs) for HSUPA operation.

In some implementations, opportunistic use of secondary scrambling codes (SSCs) in VCs may be used to achieve additional capacity. For example, each PSC that identifies a cell (or VC cluster) may have a set of 15 secondary scrambling codes. Adjacent virtual cells may use different scrambling codes (e.g., PSC and multiple SSCs) for traffic channels while broadcast information is always scrambled using the PSC. This results in DL-OVSF code tree reuse of one, which increases system capacity provided the interference from VCs using different scrambling codes is managed intelligently.

A switch to SSC mode may be opportunistic (e.g., only invoked when necessary and possible). This allows for more capacity than simple OVSF partitioning. For example, SSC mode may be invoked if peak capacity of the VC cluster is reached and there is a capacity need. In this way, interference may be avoided until the single PSC capacity is maxed out. As another example, SSC mode may be invoked if user geometry permits using SSCs without too much interference.

The transmit power of the PHYs may be adjusted to tradeoff interference for capacity.

A single small cell identity may be preserved as discussed herein thereby making mobility easier. Handle, admission control, load balancing, intra and inter VC mobility also may be performed as discussed herein.

A variety of architectures may be employed to implement the teachings herein. For example, NodeB functions may be overlapped over multiple virtual cells. RRM responsibility may be handed-over between NodeBs. This may be achieved via, for example, Node B application protocol (NBAP)-style signaling (to tip a NodeB to take over RRM responsibility), configuration of common CQI/UL Sensing/RSCP thresholds among NodeBs, or reliance on (+ tweaking of) radio link failure (RLF) mechanism.

In some implementations, NodeB functionality may be co-located with a Radio Network Controller (RNC). In this case RRM responsibility handling may be unnecessary.

In some implementations, NodeBs may be assigned to non-overlapping virtual cells. In this case RRM responsibility may require inter-NodeB communication (e.g., via NBAP) or reliance on RLF-based handover.

Figure 9:
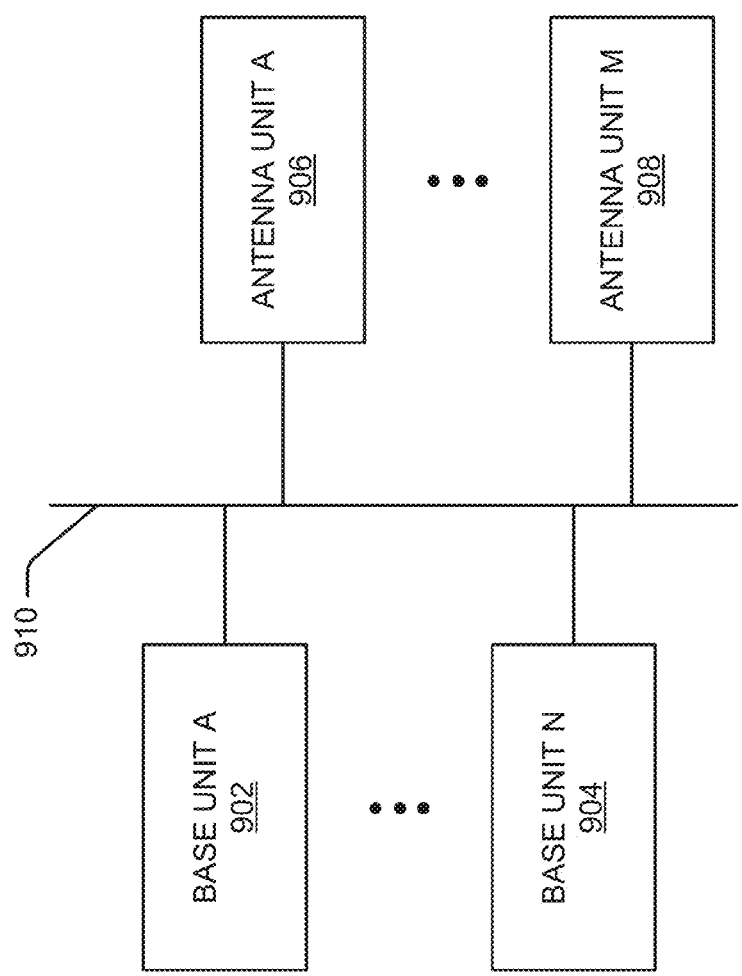
FIG. 9 is a simplified block diagram illustrating an example of a distributed antenna architecture including multiple base units and multiple antenna units.
Figure 10:
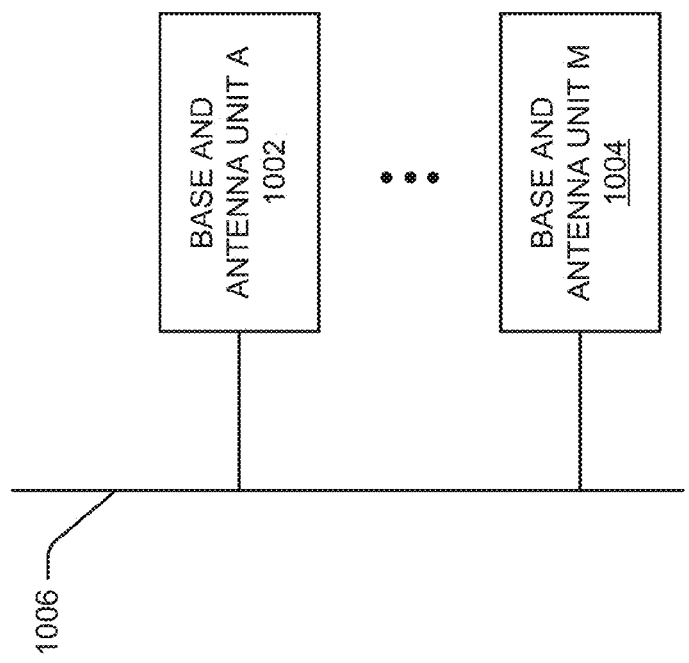
FIG. 10 is a simplified block diagram illustrating an example of a distributed antenna architecture including multiple base and antenna units.

As mentioned above, a shared PSC-split PHY scheme may be implemented in various ways. FIGS. 9 and 10 illustrate two implementations that employ distributed base unit (e.g., UMTS stack) functionality.

In FIG. 9, several base units 902-904 are communicatively coupled (e.g., via a signal bus 910) with several antenna units 906-908. In some cases, each base unit controls resource allocation for single one of the antenna units. In some cases, the base units cooperate (e.g., communicate) to control resource allocation for multiple antenna units.

In FIG. 10, base unit functionality and antenna unit functionality is co-located. In some cases, each base and antenna unit controls its own resource allocation. In some cases, the base and antenna units 1002-1004 cooperate (e.g., communicate via a signal bus 1006) to control resource allocation for one another.

Figure 11:
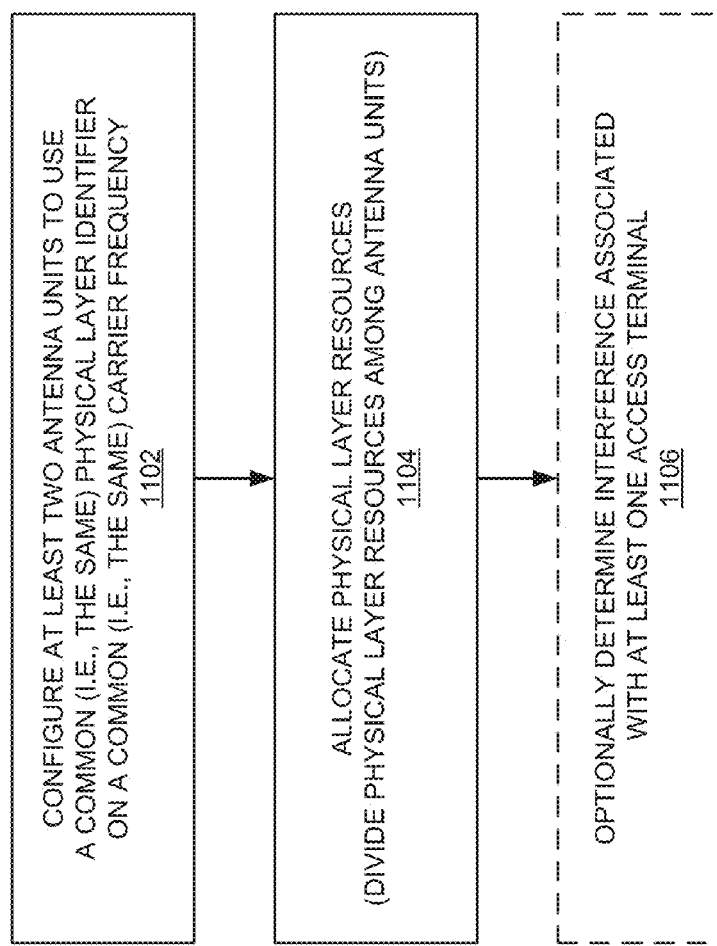
FIG. 11 is a flowchart of several sample aspects of operations that may be performed in conjunction with a distributed antenna architecture.

FIG. 11 illustrates an example of operations that may be performed by a base station that supports a shared PSC-split PHY scheme. For purposes of illustration, these operations may be described as being performed by an apparatus such as a base station (e.g., a small cell eNodeB) implemented in accordance with the teachings herein. It should be appreciated, however, that some of these operations may be performed by other types of components and may be performed using a different number of components. It also should be appreciated that one or more of the operations described herein may not be employed in a given implementation.

As discussed herein, the apparatus comprises a plurality of antenna units communicatively coupled to at least one base unit. In addition, the antenna units are physically separated. In some aspects, the at least one base unit may comprise a UMTS stack and each of the antenna units may comprise a physical layer entity.

In some aspects, the at least one base unit may comprises a first base unit and a second base unit; and the first base unit and second base unit share control of physical resources in at least one of the antenna units.

In some aspects, the at least one base unit may be co-located with at least one of the antenna units. For example, the at least one base unit and the at least one antenna units may be located within the same housing, located in the same room, located on a common apparatus (e.g., circuit board), or co-located in some other manner.

In some aspects, the at least one base unit may comprise a first base unit and a second base unit; the plurality of antenna units comprises a first antenna unit and a second antenna unit; the first base unit is collocated with the first antenna unit; and the second base unit is collocated with the second antenna unit. In some aspects, the first base unit may control physical layer resource allocation for the first antenna unit; and the second base unit may control physical layer resource allocation for the second antenna unit. In some aspects, the first base unit and the second base unit may communicate to share physical layer resources between the first antenna unit and the second antenna unit.

In some aspects, the at least one base unit may comprise a plurality of base units; and at least one first base unit of the plurality of base units may be configured to share control of at least one of the physical layer resources with at least one second base unit of the plurality of base units. In some aspects, the at least one first base unit and the at least one second base unit may be configured to communicate to control sharing of the at least one of the physical layer resources between at least one first antenna unit of the plurality of antenna units and at least one second antenna unit of the plurality of antenna units. In some aspects, the at least one first base unit may control physical layer resource allocation for the at least one first antenna unit; and the at least one second base unit may control physical layer resource allocation for the at least one second antenna unit. In some aspects, the at least one first antenna unit and the at least one second antenna unit may use a common physical layer identifier on a common carrier frequency. In some aspects, the at least one first base unit and the at least one second base unit may share control of physical layer resources in at least one of the antenna units. In some aspects, the at least one first base unit and the at least one second base unit may communicate to control sharing of physical layer resources between at least two of the antenna units.

As represented by block 1102, the apparatus (e.g., the at least one base unit) configures at least two of the antenna units to use a common physical layer identifier on a common carrier frequency. Here, the term "common" means "the same." That is, each antenna unit uses the same carrier frequency.

The physical layer identifier may take different forms in different implementations. For example, the physical layer identifier may comprise a primary scrambling code (PSC) or a physical cell identity (PCI).

In some implementations, the at least one base unit comprises a Radio Access Network (RAN) stack; and each of the antenna units comprises a physical layer entity. In some aspects, the RAN stack may comprise a UMTS stack. In some aspects, each of the antenna units may comprise a bank of modulators and demodulators and at least one antenna to transmit and receive radio frequency signals.

In some implementations, each of the antenna units may be configured to implement functionalities for a physical layer; and the at least one base unit is configured to implement functionalities for layers other than the physical layer.

In some implementations, each of the antenna units may be configured to provide mobility management for access terminals operating within coverage of the apparatus. In some aspects, the mobility management may comprise, at each of the antenna units, searching for uplink scrambling codes used by any of the access terminals within coverage of another one of the antenna units.

In some aspects, the mobility management may comprise determining that a first one of the access terminals has moved from coverage of a first one of the antenna units to a second one of the antenna units; and changing allocation of at least one of uplink or downlink resources for at least one other one of the access terminals within coverage of at least one of the antenna units based on the determination that the first one of the access terminals has moved. In some aspects, the change may consist of changing at least one of a first set of uplink scrambling codes used by the first one of the antenna units and a second set of uplink scrambling codes used by the second one of the antenna units. In some aspects, the change may consist of changing at least one of the downlink resources in at least one of the antenna units. In some aspects, the determination that the access terminal has moved may be based on sensing an uplink transmission of the access terminal descrambled with a scrambling code of the access terminal at the second one of the antenna units. In some aspects, the sensing may rely on determining that an uplink pilot of the access terminal exceeds an absolute or relative threshold. In some aspects, the sensing may rely on determining an absolute or relative ability to decode an uplink transmission of the access terminal on specific channels. In some aspects, the specific channels comprise at least one of UL-DPCH, HS-DPCCH, E-DCH, E-DPDCH, or E-DPCCH.

As represented by block 1104, the apparatus (e.g., the at least one base unit) allocates physical layer resources. As discussed herein, in some aspects, the allocation of the physical layer resources comprises dividing the physical layer resources among the antenna units.

Physical layer resources may be divided among the antenna units to mitigate, within a geographical area, potential interference associated with signals from the antenna units. For example, in the event two antenna units are relatively close to one another, a first portion of a set of physical layers resource may be allocated to one antenna unit and a second portion of a set of physical layers resource may be allocated to another antenna unit. In this way, in the event an access terminal is able to receive transmissions from both antenna units, the access terminal may be able to receive transmissions from one antenna unit without experiencing undue interference from the transmissions from the other antenna unit. In some cases, the division of resources is orthogonal (e.g., mutually exclusive). In other cases, there can be some overlap between the division of resources.

The physical layer resource may take different forms in different implementations. In some aspects, the physical layer resources may comprise at least one of: downlink (DL) physical resources, uplink (UL) physical resources, assignment of DL resources over time, or assignment of UL resources over time. In some aspects, the physical layer resources may comprise at least one of: downlink orthogonal variable spreading factor (DL-OVSF) codes, uplink scrambling codes, or transmission time intervals (TTIs). In some aspects, the DL physical layer resources may comprise DL-OVSF codes for UMTS, resource blocks (RB) for LTE, or frequency and time slots for GSM. In some aspects, the UL physical layer resources may comprise long scrambling codes for UMTS, RBs for LTE, or frequency and time slots for GSM.

In some aspects, the physical layer resources may comprise downlink (DL) physical resources; and at least a portion of the DL physical resources are reused across at least two antenna units sharing the common physical layer identifier in the apparatus. In some aspects, the DL physical resources may comprise DL OVSF codes corresponding to paging and broadcast channel, secondary common control physical channel (S-CCPCH), or OVSF codes used for handover of access terminals from other apparatuses or from antenna units using other physical layer identifiers.

The allocation (e.g., assignment) of physical layer resource may take different forms in different implementations. In some aspects, the allocation of DL and/or UL resources may comprise assigning non-conflicting DL and/or UL resources to transmission time intervals (TTIs) subject to simultaneous use by different ones of the antenna units at an access terminal location. In some aspects, the allocation of the physical layer resources may comprise: detecting a first access terminal within coverage of at least one of the antenna units; and identifying one of the physical layer resources for assignment to the first access terminal based on whether assignment of the identified physical layer resource to the first access terminal will interfere with use of the identified physical layer resource by a second access terminal. In some aspects, the allocation of the physical layer resources may comprise dynamically determining whether to orthogonalize usage of the physical layer resources between two or more of the antenna units.

As mentioned above, the allocation (e.g., assignment) of physical layer resource may comprise dividing physical layer resources among antenna units. In some aspects, the dividing of physical layer resources may comprise allocating a first subset of a set of downlink orthogonal variable spreading factors (DL-OVSF) codes to a first one of the antenna units; and allocating a second subset (e.g., different from the first subset) of the set of DL-OVSF codes to a second one of the antenna units. In some aspects, the dividing of physical layer resources may comprise allocating a third shared subset of the DL-OVSF codes that is common to two or more of the antenna units. In some aspects, the dividing of physical layer resources may be performed via configuration. In some aspects, the dividing of physical layer resources may change according to presence of access terminals in at least one coverage region of the antenna units. In some aspects, more physical layer resources may be allocated at a portion of the antenna units where downlink demand is larger as measured by an amount of generated traffic. In some aspects, more physical layer resources may be allocated at a portion of the antenna units where downlink demand is larger as measured by a quantity of access terminals. In some aspects, the dividing of physical layer resources may comprise allocating a first subset of a set of uplink long scrambling codes to a first one of the antenna units; and allocating a second subset (e.g., different from the first subset) of the set of uplink long scrambling codes to a second one of the antenna units. In some aspects, the dividing of physical layer resources may comprise co-ordination of physical resources utilized in overlapping time of transmission time intervals over different ones of the antenna units. In some aspects, the dividing of the physical layer resources comprises allocating different secondary scrambling codes to two or more of the antenna units based on traffic demand.

In some implementations, the allocation (e.g., assignment) of physical layer resource comprises controlling the sharing of physical layer resources. In some aspects, the controlling of the sharing of physical layer resources may comprise dynamically determining whether to orthogonalize usage of the physical layer resources between two or more of the antenna units. In some aspects, the determination of whether to orthogonalize usage of the physical layer resources may be based on interference associated with at least one access terminal within coverage of the apparatus. In some aspects, the determination of whether to orthogonalize usage of the physical layer resources may be based on proximity of access terminals within coverage of the apparatus. In some aspects, the determination of whether to orthogonalize usage of the physical layer resources may be based on whether an access terminal is near a cell edge of at least one of the antenna units. In some aspects, the determination of whether to orthogonalize usage of the physical layer resources may be based on a quantity of access terminals within coverage of at least one cell of at least one of the antenna units.

In some aspects, the controlling of the sharing of physical layer resources may comprise reusing the physical layer resources among the antenna units. In some aspects, the at least one base unit may be further configured to, in response to a determination to reuse the physical layer resources among the antenna units, adjust at least one transmit power of the antenna units. In some aspects, the reuse may be triggered based on a proximity of access terminals within coverage of the apparatus.

In some aspects, the controlling of the sharing of physical layer resources may comprise allocating different secondary scrambling codes to two or more of the antenna units (e.g., based on traffic demand). In some aspects, the allocation of the different secondary scrambling codes may be triggered based on available capacity of the apparatus. In some aspects, the allocation of the different secondary scrambling codes may be triggered based on locations of access terminals within coverage of the apparatus.

In some aspects, timing may be controlled by the base station and/or an associated access terminal. For example, a timing difference of a particular channel observed by an access terminal from transmissions via multiple antennas may be maintained within a predefined bound. In some aspects, the predefined bound allows access terminals to combine signals in a common manner as signals received from multiple arrival paths from a single antenna. In some aspects, the predefined bound may be 100 microseconds.

As represented by optional block 1106, the apparatus (e.g., the at least one base unit) may determine the interference associated with at least one access terminal. As discussed herein, this determination may be made in conjunction with a determination of whether to orthogonalize usage of the physical layer parameters. For example, if a determination is made that an access terminal is subjected to interference from one antenna unit when the access terminal is trying to receive signals from another antenna unit, the apparatus may elect to reallocate the resources for the antenna units in an attempt to reduce this interference. Conversely, if a determination is made that an access terminal is not subjected to interference from one antenna unit when the access terminal is receiving signals from another antenna unit, the apparatus may elect to reuse the resources between the antenna units to increase the traffic handling capacity of the base station.

In some aspects, the determination of the interference is based on sensing of uplink signals. In some aspects, the sensing may rely on determining that an uplink pilot of the at least one access terminal exceeds an absolute or relative threshold. In some aspects, the sensing may rely on determining an absolute or relative ability to decode an uplink transmission of the at least one access terminal on specific channels. In some aspects, the sensing may rely on an indication of absolute or relative quality and/or power of downlink channels received at the at least one access terminal, where the downlink channels are sent from the antenna units. In some aspects, the downlink channels being sensed by the access terminal from the antenna units may be orthogonal or pseudo-orthogonal. In some aspects, the orthogonal downlink channels may be associated with OVSF codes and the pseudo-orthogonal downlink channels may be associated with gold codes.

In some aspects, the determination of the interference is based on channel quality feedback.

In some aspects, the determination of the interference is based on received signal code power feedback. In some aspects, the received signal code power may comprise CPICH RSCP.

In some aspects, the determination of the interference is based on received signal code quality feedback. In some aspects, the received signal code quality may comprise CPICH Ec/Io.

Figure 12:
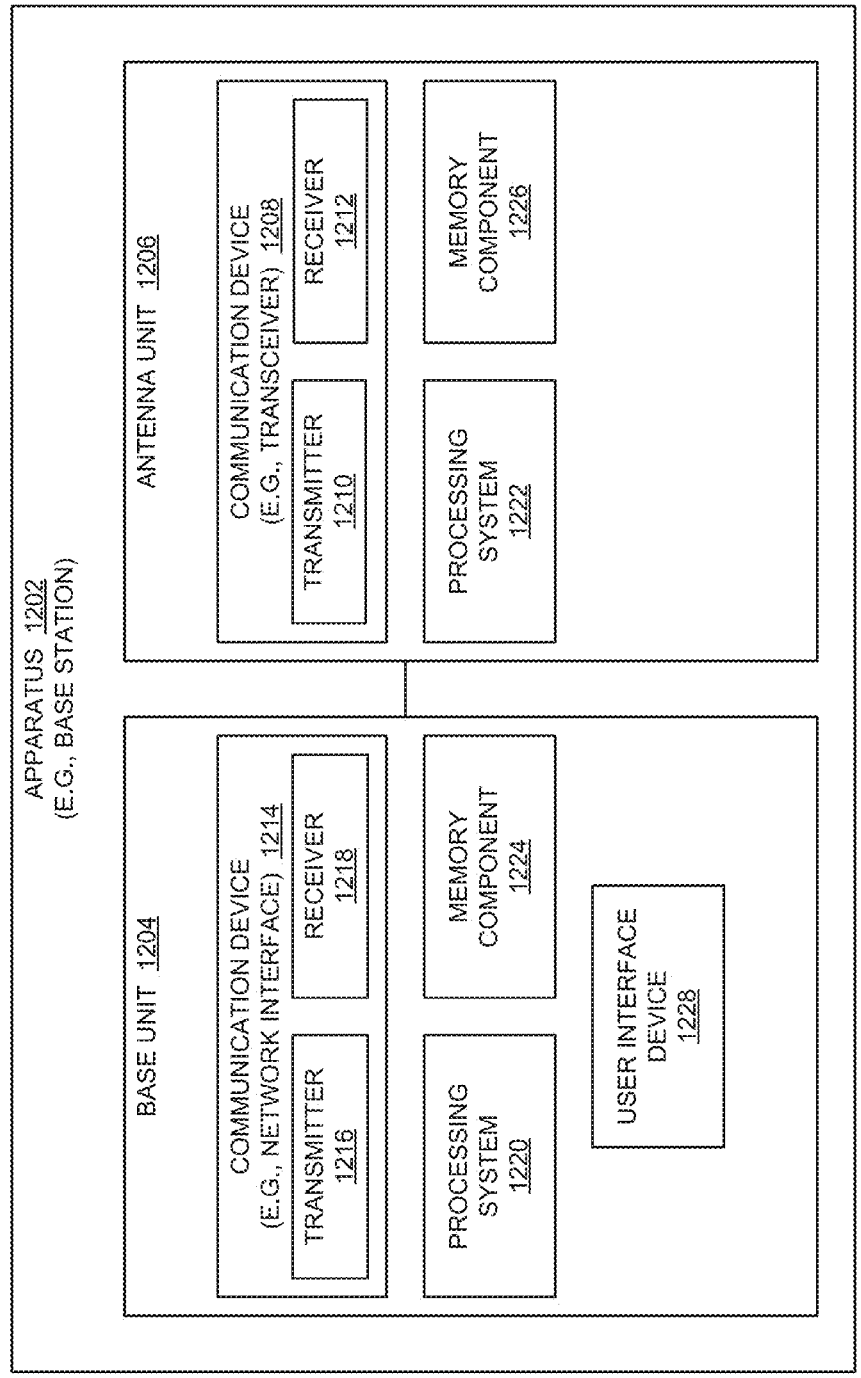
FIG. 12 is a simplified block diagram of several sample aspects of components that may be employed in a communication node.

FIG. 12 illustrates several sample components (represented by corresponding blocks) that may be incorporated into an apparatus 1202 (e.g., a base station such as an eNodeB, a Home eNodeB, etc.) in accordance with the teachings herein. It should be appreciated that these components may be implemented in different types of apparatuses in different implementations (e.g., in an application-specific integrated circuit (ASIC), in a system-on-a-chip (SoC), etc.). The described components also may be incorporated into other apparatuses in a communication system. For example, other apparatuses in a system may include components similar to those described for the apparatus 1202 to provide similar functionality. Also, a given apparatus may contain one or more of the described components. For example, an apparatus may include multiple transceiver components that enable the apparatus to operate on multiple carriers and/or communicate via different technologies.

The apparatus 1202 is depicted as including a base unit 1204 and a remote antenna unit 1206. In practice, it should be appreciated that the apparatus 1202 will include other remote antenna units (not shown in FIG. 12) in accordance with the teachings herein.

The apparatus 1202 includes at least one wireless communication device (represented by the communication device 1208) for communicating with other nodes via at least one designated radio access technology. The wireless communication device 1208 includes at least one transmitter (represented by the transmitter 1210) for sending signals (e.g., messages, indications, information, and so on) and at least one receiver (represented by the receiver 1212) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some embodiments, a wireless communication device (e.g., one of multiple wireless communication devices) of the apparatus 1202 comprises a network listen module.

The apparatus 1202 includes at least one communication device (represented by the communication device 1214) for communicating with other nodes. For example, the communication device 1214 may comprise a network interface that is configured to communicate with one or more network entities via a wire-based or wireless backhaul. In some aspects, the communication device 1214 may be implemented as a transceiver configured to support wire-based or wireless signal communication. This communication may involve, for example, sending and receiving: messages, parameters, other types of information, and so on. Accordingly, in the example of FIG. 12, the communication device 1214 is shown as comprising a transmitter 1216 and a receiver 1218.

The apparatus 1202 also includes other components that may be used in conjunction with operations as taught herein. For example, the base unit 1204 and the antenna unit 1206 include processing systems 1220 and 1222, respectively, for providing functionality relating to shared PSC-split PHY operations and for providing other processing functionality. The base unit 1204 and the antenna unit 1206 include memory components 1224 and 1226 (e.g., each including a memory device), respectively, for maintaining information (e.g., information, thresholds, parameters, and so on). In addition, the apparatus 1202 includes a user interface device 1228 for providing indications (e.g., audible and/or visual indications) to a user and/or for receiving user input (e.g., upon user actuation of a sensing device such a keypad, a touch screen, a microphone, and so on).

The components of FIG. 12 may be implemented in various ways. In some implementations, the components of FIG. 12 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by the blocks may be implemented by processor and memory component(s) of the apparatus (e.g., by execution of appropriate code and/or by appropriate configuration of processor components).

As mentioned above, some of the access points referred to herein may comprise low-power access points. As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro cell while a node that provides coverage over a relatively small area (e.g., a residence) may be referred to as a small cell. It should be appreciated that the teachings herein may be applicable to nodes associated with various types of coverage areas. For example, a pico access point may provide coverage (e.g., coverage within a commercial building) over an area that is smaller than a macro area and larger than a femto area. In various applications, other terminology may be used to reference a macro cell, a small cell, or other access point-type nodes. For example, a macro cell may be configured or referred to as an access node, base station, access point, eNodeB, macro, and so on. Also, a small cell may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 13:
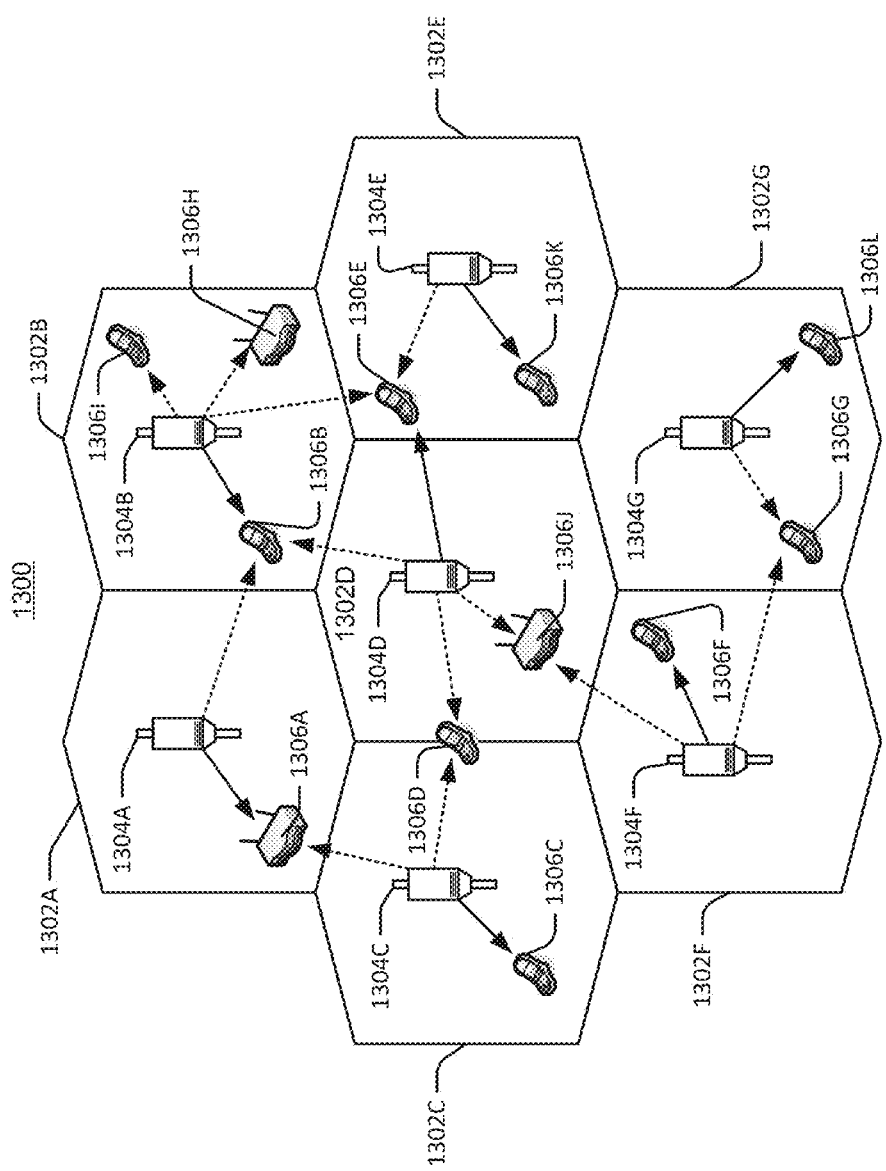
FIG. 13 is a simplified diagram of a wireless communication system.

FIG. 13 illustrates a wireless communication system 1300, configured to support a number of users, in which the teachings herein may be implemented. The system 1300 provides communication for multiple cells 1302, such as, for example, macro cells 1302A-1302G, with each cell being serviced by a corresponding access point 1304 (e.g., access points 1304A-1304G). As shown in FIG. 13, access terminals 1306 (e.g., access terminals 1306A-1306L) may be dispersed at various locations throughout the system over time. Each access terminal 1306 may communicate with one or more access points 1304 on a forward link (FL) and/or a reverse link (RL) at a given moment, depending upon whether the access terminal 1306 is active and whether it is in soft handoff, for example. The wireless communication system 1300 may provide service over a large geographic region. For example, macro cells 1302A-1302G may cover a few blocks in a neighborhood or several miles in a rural environment.

Figure 14:
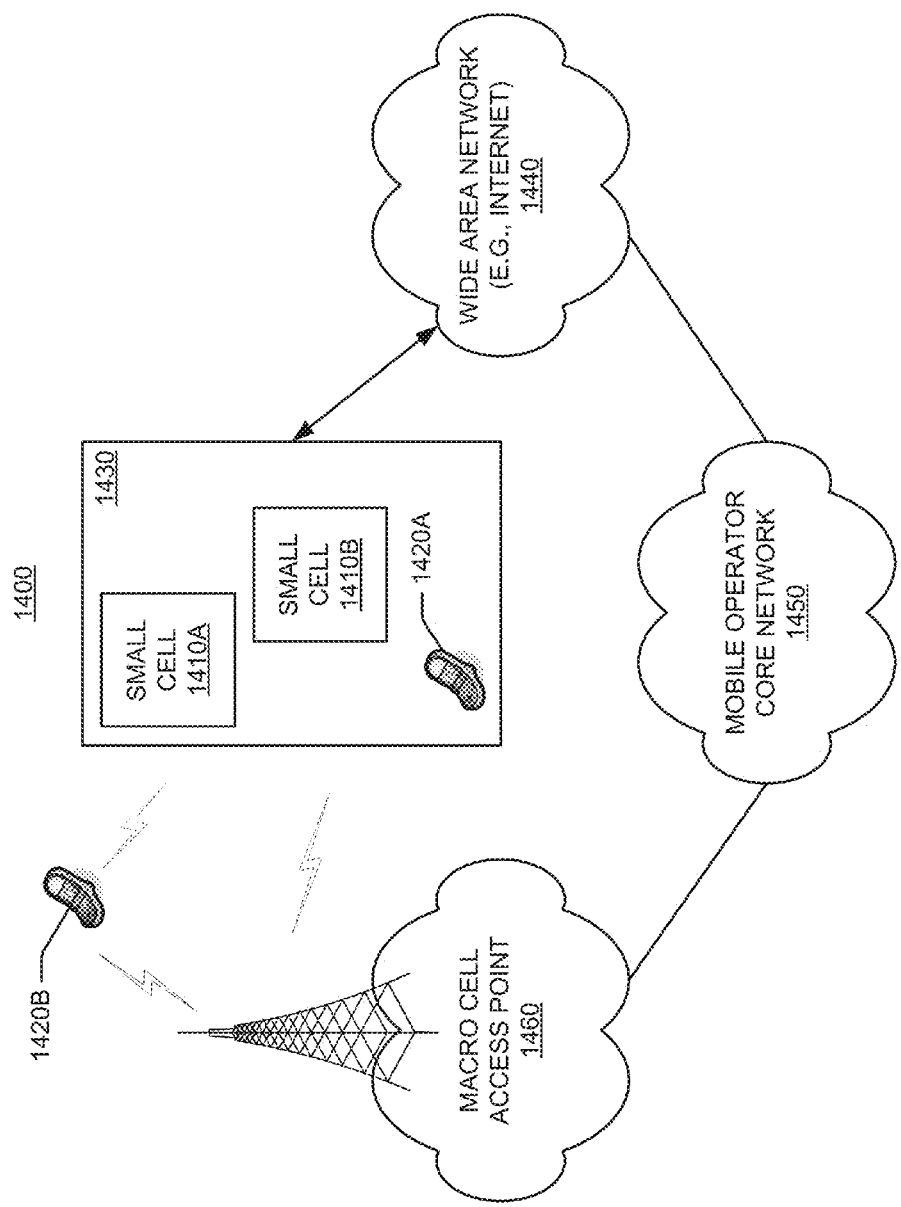
FIG. 14 is a simplified diagram of a wireless communication system including small cells.

FIG. 14 illustrates an exemplary communication system 1400 where one or more small cells are deployed within a network environment. Specifically, the system 1400 includes multiple small cells 1410 (e.g., small cells 1410A and 1410B) installed in a relatively small-scale network environment (e.g., in one or more user residences or enterprise locations 1430). Each small cell 1410 may be coupled to a wide area network 1440 (e.g., the Internet) and a mobile operator core network 1450 via a DSL router, a cable modem, a wireless link, or other connectivity means (not shown). As will be discussed below, each small cell 1410 may be configured to serve associated access terminals 1420 (e.g., access terminal 1420A) and, optionally, other (e.g., hybrid or alien) access terminals 1420 (e.g., access terminal 1420B). In other words, access to small cells 1410 may be restricted whereby a given access terminal 1420 may be served by a set of designated (e.g., home) small cell(s) 1410 but may not be served by any non-designated small cells 1410 (e.g., a neighbor's small cell 1410).

Figure 15:
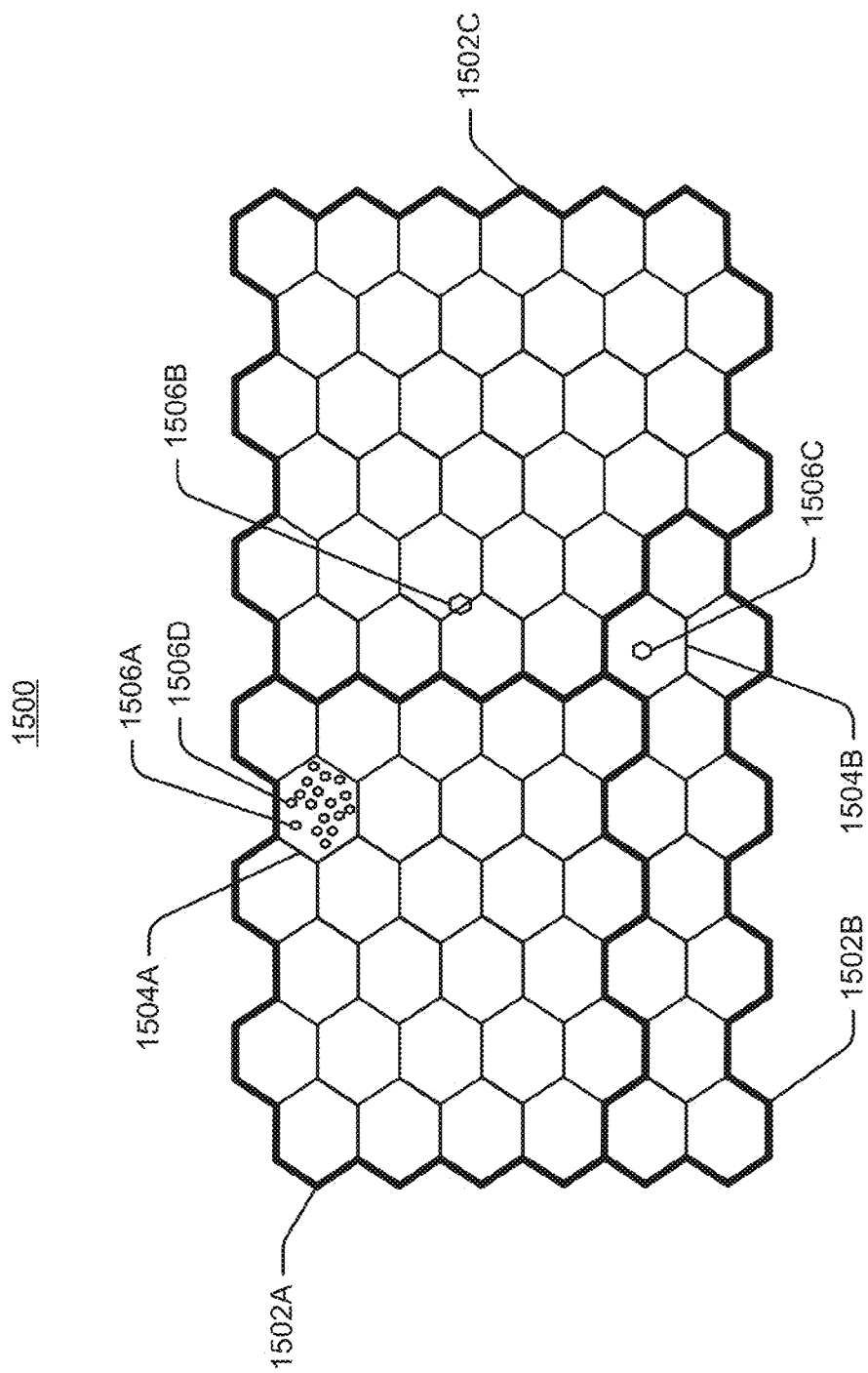
FIG. 15 is a simplified diagram illustrating coverage areas for wireless communication.

FIG. 15 illustrates an example of a coverage map 1500 where several tracking areas 1502 (or routing areas or location areas) are defined, each of which includes several macro coverage areas 1504. Here, areas of coverage associated with tracking areas 1502A, 1502B, and 1502C are delineated by the wide lines and the macro coverage areas 1504 are represented by the larger hexagons. The tracking areas 1502 also include small cell coverage areas 1506. In this example, each of the small cell coverage areas 1506 (e.g., small cell coverage areas 1506B and 1506C) is depicted within one or more macro coverage areas 1504 (e.g., macro coverage areas 1504A and 1504B). It should be appreciated, however, that some or all of a small cell coverage area 1506 might not lie within a macro coverage area 1504. In practice, a large number of small cell coverage areas 1506 (e.g., small cell coverage areas 1506A and 1506D) may be defined within a given tracking area 1502 or macro coverage area 1504.

Referring again to FIG. 14, the owner of a small cell 1410 may subscribe to mobile service, such as, for example, 3G mobile service, offered through the mobile operator core network 1450. In addition, an access terminal 1420 may be capable of operating both in macro environments and in smaller scale (e.g., residential) network environments. In other words, depending on the current location of the access terminal 1420, the access terminal 1420 may be served by a macro cell access point 1460 associated with the mobile operator core network 1450 or by any one of a set of small cells 1410 (e.g., the small cells 1410A and 1410B that reside within a corresponding user residence 1430). For example, when a subscriber is outside his home, he is served by a standard macro access point (e.g., access point 1460) and when the subscriber is at home, he is served by a small cell (e.g., access point 1410A). Here, a small cell 1410 may be backward compatible with legacy access terminals 1420.

A small cell 1410 may be deployed on a single frequency or, in the alternative, on multiple frequencies. Depending on the particular configuration, the single frequency or one or more of the multiple frequencies may overlap with one or more frequencies used by a macro access point (e.g., access point 1460).

In some aspects, an access terminal 1420 may be configured to connect to a preferred small cell (e.g., the home small cell of the access terminal 1420) whenever such connectivity is possible. For example, whenever the access terminal 1420A is within the user's residence 1430, it may be desired that the access terminal 1420A communicate only with the home small cell 1410A or 1410B.

In some aspects, if the access terminal 1420 operates within the macro cellular network 1450 but is not residing on its most preferred network (e.g., as defined in a preferred roaming list), the access terminal 1420 may continue to search for the most preferred network (e.g., the preferred small cell 1410) using a better system reselection (BSR) procedure, which may involve a periodic scanning of available systems to determine whether better systems are currently available and subsequently acquire such preferred systems. The access terminal 1420 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 1410, the access terminal 1420 selects the small cell 1410 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1410 that reside within the corresponding user residence 1430). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., 911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 16:
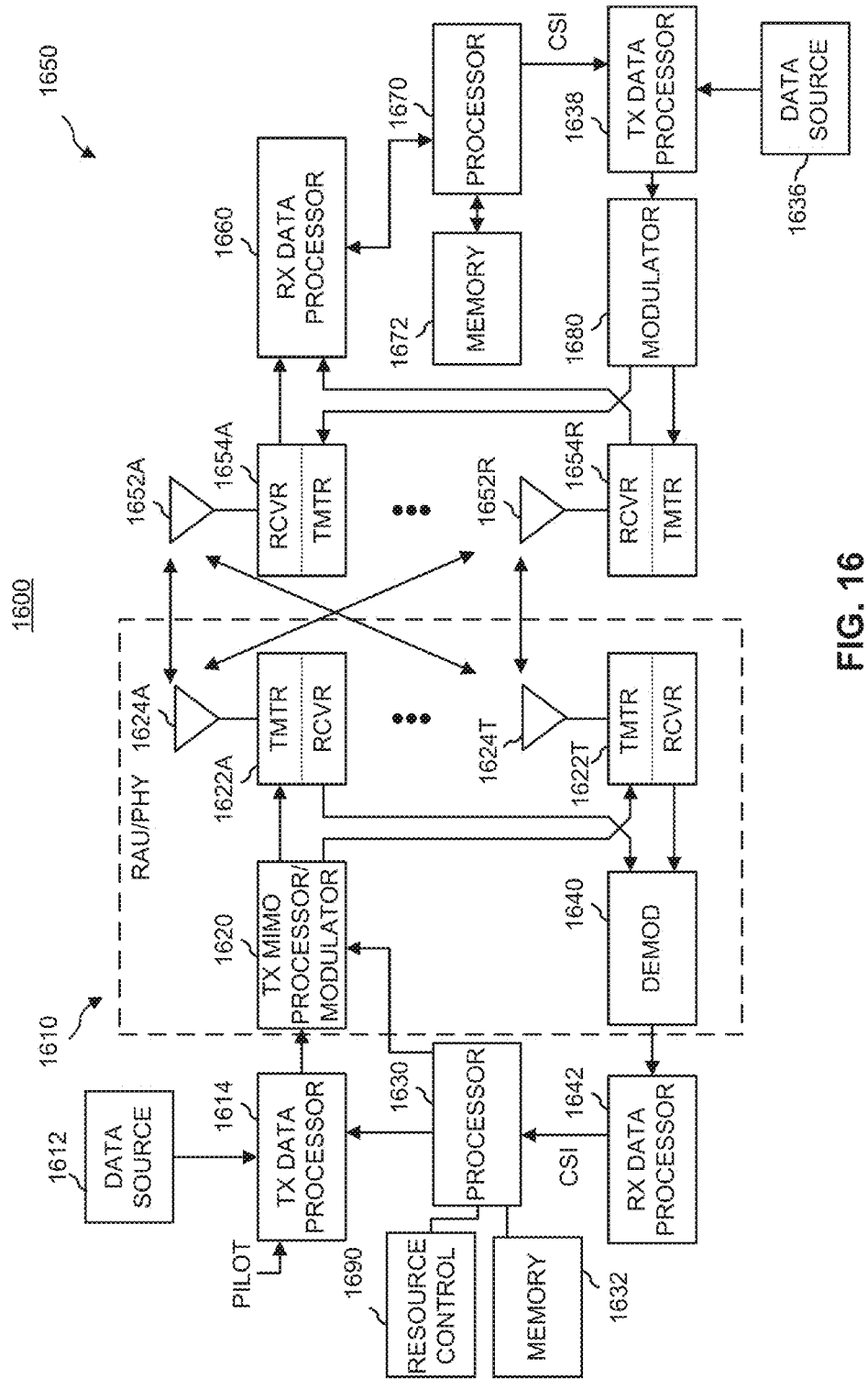
FIG. 16 is a simplified block diagram of several sample aspects of communication components.

FIG. 16 illustrates a wireless device 1610 (e.g., an access point) and a wireless device 1650 (e.g., an access terminal) of a sample MIMO system 1600. At the device 1610, traffic data for a number of data streams is provided from a data source 1612 to a transmit (TX) data processor 1614. Each data stream may then be transmitted over a respective transmit antenna.

FIG. 16 also illustrates that radio components (e.g., modulator, demodulator, transmitters, and receivers) and other components of a wireless device may be employed in a RAU/PHY in accordance with the teachings herein. To reduce the complexity of FIG. 16 only a single RAU/PHY is shown. It should be appreciated, however, that a wireless device constructed in accordance with the teachings herein generally includes multiple RAU/PHYs.

The TX data processor 1614 may format, code, and interleave the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream may then be modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1630. A data memory 1632 may store program code, data, and other information used by the processor 1630 or other components of the device 1610.

The modulation symbols for all data streams are then provided to a TX MIMO processor 1620, which may further process the modulation symbols (e.g., for OFDM). The TX MIMO processor 1620 then provides $N_T$ modulation symbol streams to $N_T$ transceivers (XCVR) 1622A through 1622T. In some aspects, the TX MIMO processor 1620 applies beam-forming weights to the symbols of the data streams and to the antenna from which the symbol is being transmitted. As indicated in FIG. 16, in modulator functionality may be implemented in the RAU/PHY (e.g., in addition to or instead of at the TX data processor 1614).

Each transceiver 1622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1622A through 1622T are then transmitted from $N_T$ antennas 1624A through 1624T, respectively.

At the device 1650, the transmitted modulated signals are received by $N_R$ antennas 1652A through 1652R and the received signal from each antenna 1652 is provided to a respective transceiver (XCVR) 1654A through 1654R. Each transceiver 1654 conditions (e.g., filters, amplifies, and downconverts) a respective received signal, digitizes the conditioned signal to provide samples, and further processes the samples to provide a corresponding "received" symbol stream.

A receive (RX) data processor 1660 then receives and processes the $N_R$ received symbol streams from $N_R$ transceivers 1654 based on a particular receiver processing technique to provide $N_T$ "detected" symbol streams. The RX data processor 1660 then demodulates, deinterleaves, and decodes each detected symbol stream to recover the traffic data for the data stream. The processing by the RX data processor 1660 is complementary to that performed by the TX MIMO processor 1620 and the TX data processor 1614 at the device 1610.

A processor 1670 periodically determines which precoding matrix to use (discussed below). The processor 1670 formulates a reverse link message comprising a matrix index portion and a rank value portion. A data memory 1672 may store program code, data, and other information used by the processor 1670 or other components of the device 1650.

The reverse link message may comprise various types of information regarding the communication link and/or the received data stream. The reverse link message is then processed by a TX data processor 1638, which also receives traffic data for a number of data streams from a data source 1636, modulated by a modulator 1680, conditioned by the transceivers 1654A through 1654R, and transmitted back to the device 1610.

At the device 1610, the modulated signals from the device 1650 are received by the antennas 1624, conditioned by the transceivers 1622, demodulated by a demodulator (DE-MOD) 1640, and processed by a RX data processor 1642 to extract the reverse link message transmitted by the device 1650. The processor 1630 then determines which pre-coding matrix to use for determining the beam-forming weights then processes the extracted message.

FIG. 16 also illustrates that the communication components may include one or more components that perform resource control operations as taught herein. For example, a resource control component 1690 may cooperate with the processor 1630 and/or other components of the device 1610 to control resources of the device 1610 as taught herein. It should be appreciated that for each device 1610 and 1650 the functionality of two or more of the described components may be provided by a single component. For example, a single processing component may provide the functionality of the resource control component 1690 and the processor 1630.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects, the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims.

Figure 17:
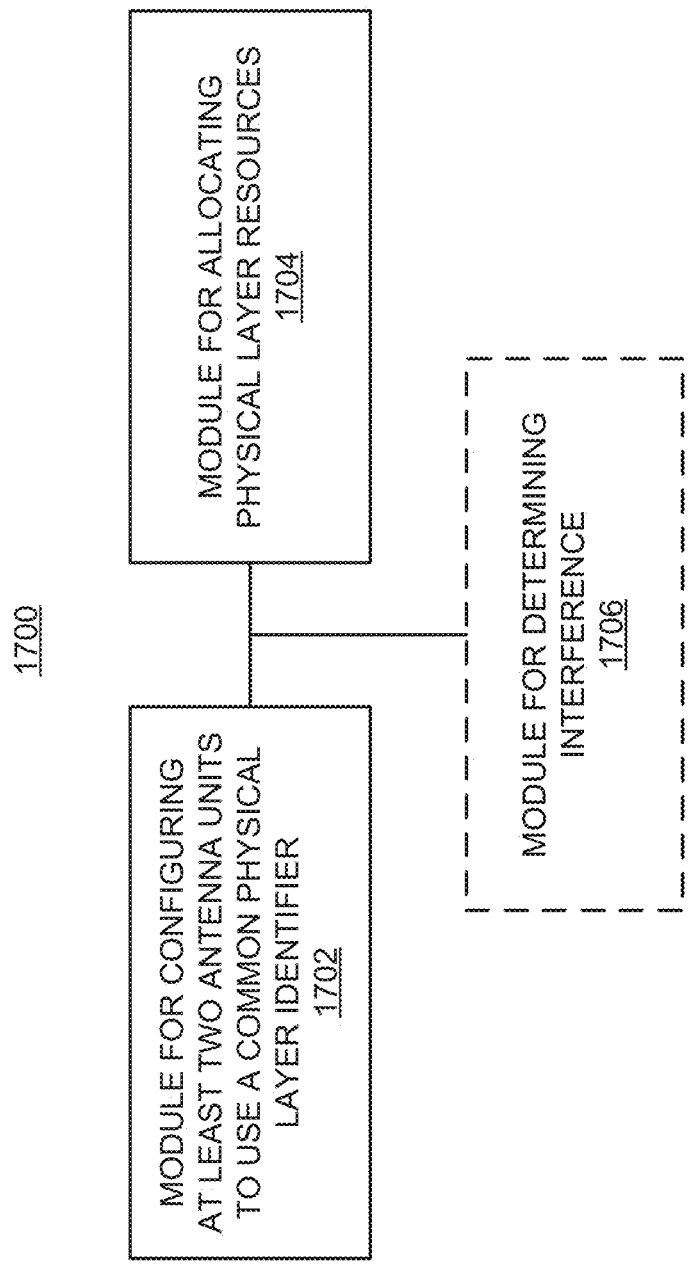
FIG. 17 is a simplified block diagram of several sample aspects of an apparatus comprising a distributed antenna architecture.

Referring to FIG. 17, an apparatus 1700 is represented as a series of interrelated functional modules. Here, a module for configuring at least two antenna units to use a common physical layer identifier 1702 may correspond at least in some aspects to, for example, a processing system as discussed herein. A module for allocating physical layer resources 1704 may correspond at least in some aspects to, for example, a processing system as discussed herein. A module for determining interference 1706 may correspond at least in some aspects to, for example, a processing system as discussed herein.

The functionality of the modules of FIG. 17 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. As one specific example, the apparatus 1700 may comprise a single device (e.g., components 1702-1706 comprising different sections of an ASIC). As another specific example, the apparatus 1700 may comprise several devices (e.g., the component 1702 comprising one ASIC, the component 1704 comprising another ASIC, and the component 1706 comprising another ASIC). The functionality of these modules also may be implemented in some other manner as taught herein. In some aspects, the dashed block in FIG. 17 (or any other figure herein) is optional.

In addition, the components and functions represented by FIG. 17 as well as other components and functions described herein, may be implemented using any suitable means. Such means also may be implemented, at least in part, using corresponding structure as taught herein. For example, the components described above in conjunction with the "module for" components of FIG. 17 also may correspond to similarly designated "means for" functionality. Thus, in some aspects one or more of such means may be implemented using one or more of processor components, integrated circuits, or other suitable structure as taught herein.

FIG. 18 is a simplified block diagram of several sample aspects of a processing circuit 1802 coupled to a computer-readable medium 1804 that may be configured to support a distributed antenna architecture. The processing circuit 1802 is generally arranged to obtain, process and/or send data, control data access and storage, issue commands, and control other desired operations, and may comprise circuitry configured to implement desired programming provided by appropriate media, such as computer-readable medium 1804, in at least one implementation.

The computer-readable medium 1804 may represent media for storing programming and/or data, such as processor executable code or instructions (e.g., software, firmware), electronic data, databases, or other digital information. The computer-readable medium 1804 may be coupled to the processing circuit 1802 such that the processing circuit 1802 can read information from, and write information to, the computer-readable medium 1804. In the alternative, the computer-readable medium 1804 may be integral to the processing circuit 1802. The computer-readable medium 1804 can include code for configuring at least two antenna units to use a common physical layer identifier 1806 and code for allocating physical layer resources 1808. In addition, the computer-readable medium 1804 can include code for determining interference 1810.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm operations described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of operations in any disclosed process is an example of a sample approach. Based upon design preferences, it is understood that the specific order or hierarchy of operations in the processes may be rearranged while remaining within the scope of the present disclosure. The accompanying method claims present elements of the various operations in a sample order, and are not meant to be limited to the specific order or hierarchy presented.

The operations of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects, a computer program product may comprise packaging materials.

In one or more implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus, comprising:
   at least one base unit configured to dynamically allocate physical layer resources for the apparatus; and
   a plurality of antenna units communicatively coupled to the at least one base unit, wherein:
   the antenna units are physically separated,
   at least two of the antenna units are configured to use a common physical layer identifier on a common carrier frequency,
   the dynamic allocation of the physical layer resources comprises dividing the physical layer resources among the at least two antenna units to mitigate, within a geographical area, potential interference associated with signals from the at least two antenna units, and
   wherein each of the at least two antenna units is configured to provide mobility management for access terminals operating within coverage of the apparatus, wherein the dynamic allocation of the physical layer resources comprises changing at least one of a first set of uplink scrambling codes used by a first one of the at least two antenna units and changing at least one of a second set of uplink scrambling codes used by a second one of the at least two antenna units in response to determining that a first one of the access terminals has moved from coverage of the first one of the antenna units to the second one of the antenna units.

2. The apparatus of claim 1, wherein the common physical layer identifier comprises a primary scrambling code or a physical cell identity.

3. The apparatus of claim 1, wherein the physical layer resources comprise at least one of: downlink physical resources, uplink physical resources, assignment of downlink resources over time, or assignment of uplink resources over time.

4. The apparatus of claim 1, wherein the physical layer resources comprise at least one of: downlink orthogonal variable spreading factor codes, uplink scrambling codes, or transmission time intervals.

5. The apparatus of claim 1, wherein:
   the at least one base unit comprises a UMTS stack; and
   each of the antenna units comprises a physical layer entity.

6. The apparatus of claim 1, wherein the mobility management comprises, at each of the antenna units, searching for uplink scrambling codes used by any of the access terminals within coverage of another one of the antenna units.

7. The apparatus of claim 1, wherein the mobility management comprises:
   determining that the first one of the access terminals has moved from coverage of the first one of the antenna units to the second one of the antenna units; and
   changing allocation of at least one of uplink or downlink resources for at least one other one of the access terminals within coverage of at least one of the antenna units based on the determination that the first one of the access terminals has moved.

8. The apparatus of claim 1, wherein the allocation of the physical layer resources comprises:
   detecting a first access terminal within coverage of at least one of the antenna units; and
   identifying one physical layer resource of the physical layer resources for assignment to the first access terminal based on whether assignment of the identified one physical layer resource to the first access terminal will interfere with use of the identified one physical layer resource by a second access terminal.

9. The apparatus of claim 1, wherein the allocation of the physical layer resources comprises dynamically determining whether to orthogonalize usage of the physical layer resources between two or more of the antenna units.

10. The apparatus of claim 1, wherein the dividing of the physical layer resources comprises:
    allocating a first subset of a set of downlink orthogonal variable spreading factor codes to the first one of the antenna units; and
    allocating a second subset of the set of downlink orthogonal variable spreading factor codes to the second one of the antenna units, wherein the second subset is different from the first subset.

11. The apparatus of claim 1, wherein the dividing of the physical layer resources comprises:
    allocating a first subset of a set of uplink scrambling codes to the first one of the antenna units; and
    allocating a second subset of the set of uplink scrambling codes to the second one of the antenna units, wherein the second subset is different from the first subset.

12. The apparatus of claim 1, wherein the dividing of the physical layer resources comprises allocating different secondary scrambling codes to two or more of the antenna units based on traffic demand.

13. The apparatus of claim 1, wherein determining that the first one of the access terminals has moved is based on sensing, by the second one of the at least two antenna units, an uplink transmission of the first one of the access terminals with a scrambling code of the first one of the access terminals.

14. A method of communication, wherein an apparatus comprises a plurality of antenna units communicatively coupled to at least one base unit, and wherein the antenna units are physically separated, the method comprising:
    configuring at least two of the antenna units to use a common physical layer identifier on a common carrier frequency;
    dynamically allocating physical layer resources for the apparatus, wherein the allocation of the physical layer resources comprises dividing the physical layer resources among the at least two antenna units to mitigate, within a geographical area, potential interference associated with signals from the at least two antenna units; and
    providing, at each of the at least two antenna units, mobility management for access terminals operating within coverage of the apparatus, wherein dynamically allocating the physical layer resources comprises changing at least one of a first set of uplink scrambling codes used by a first one of the at least two antenna units and changing at least one of a second set of uplink scrambling codes used by a second one of the at least two antenna units in response to determining that a first one of the access terminals has moved from coverage of the first one of the antenna units to the second one of the antenna units.

15. The method of claim 14, wherein the common physical layer identifier comprises a primary scrambling code or a physical cell identity.

16. The method of claim 14, wherein the physical layer resources comprise at least one of: downlink physical resources, uplink physical resources, assignment of downlink resources over time, or assignment of uplink resources over time.

17. The method of claim 14, wherein the physical layer resources comprise at least one of: downlink orthogonal variable spreading factor codes, uplink scrambling codes, or transmission time intervals.

18. The method of claim 14, wherein:
the at least one base unit comprises a UMTS stack; and
each of the antenna units comprises a physical layer entity.

19. The method of claim 14, wherein the mobility management comprises, at each of the antenna units, searching for uplink scrambling codes used by any of the access terminals within coverage of another one of the antenna units.

20. The method of claim 14, wherein the mobility management comprises:
determining that the first one of the access terminals has moved from coverage of the first one of the antenna units to the second one of the antenna units; and
changing allocation of at least one of uplink or downlink resources for at least one other one of the access terminals within coverage of at least one of the antenna units based on the determination that the first one of the access terminals has moved.

21. The method of claim 14, wherein the allocation of the physical layer resources comprises:
detecting a first access terminal within coverage of at least one of the antenna units; and
identifying one physical layer resource of the physical layer resources for assignment to the first access terminal based on whether assignment of the identified one physical layer resource to the first access terminal will interfere with use of the identified one physical layer resource by a second access terminal.

22. The method of claim 14, wherein the allocation of the physical layer resources comprises dynamically determining whether to orthogonalize usage of the physical layer resources between two or more of the antenna units.

23. The method of claim 14, wherein the dividing of the physical layer resources comprises:
allocating a first subset of a set of downlink orthogonal variable spreading factor codes to the first one of the antenna units; and
allocating a second subset of the set of downlink orthogonal variable spreading factor codes to the second one of the antenna units, wherein the second subset is different from the first subset.

24. The method of claim 14, wherein the dividing of the physical layer resources comprises:
allocating a first subset of a set of uplink scrambling codes to the first one of the antenna units; and
allocating a second subset of the set of uplink scrambling codes to the second one of the antenna units, wherein the second subset is different from the first subset.

25. The method of claim 14, wherein the dividing of the physical layer resources comprises allocating different secondary scrambling codes to two or more of the antenna units based on traffic demand.

26. An apparatus for communication, comprising
a plurality of antenna units communicatively coupled to at least one base unit, wherein the antenna units are physically separated;
means for configuring at least two of the antenna units to use a common physical layer identifier on a common carrier frequency;
means for dynamically allocating physical layer resources for the apparatus, wherein the allocation of the physical layer resources comprises dividing the physical layer resources among the at least two antenna units to mitigate, within a geographical area, potential interference associated with signals from the at least two antenna units; and
means for providing, at each of the at least two antenna units, mobility management for access terminals operating within coverage of the apparatus, wherein the means for dynamically allocating the physical layer resources comprises means for changing at least one of a first set of uplink scrambling codes used by a first one of the at least two antenna units and changing at least one of a second set of uplink scrambling codes used by a second one of the at least two antenna units in response to determining that a first one of the access terminals has moved from coverage of the first one of the antenna units to the second one of the antenna units.

27. The apparatus of claim 26, further comprising means for determining interference associated with at least one access terminal within coverage of the apparatus, wherein:
the allocation of the physical layer resources comprises dynamically determining whether to orthogonalize usage of the physical layer resources between two or more of the antenna units, and
the determination of whether to orthogonalize usage of the physical layer resources is based on the determined interference.

28. The apparatus of claim 26, wherein the interference is determined based on at least one of: sensing of uplink signals, channel quality feedback, received signal code power feedback, or received signal code quality feedback.

29. A non-transitory computer-readable medium comprising program code stored thereon for use with an apparatus that comprises at least one base unit and a plurality of antenna units communicatively coupled to the at least one base unit, the program code comprising instructions to direct the at least one base unit to:
configure at least two of the antenna units to use a common physical layer identifier on a common carrier frequency;
dynamically allocate physical layer resources for the apparatus, wherein the allocation of the physical layer resources comprises dividing the physical layer resources among the at least two antenna units to mitigate, within a geographical area, potential interference associated with signals from the at least two antenna units; and
provide, at each of the at least two antenna units, mobility management for access terminals operating within coverage of the apparatus, wherein the dynamic allocation of the physical layer resources comprises changing at least one of a first set of uplink scrambling codes used by a first one of the at least two antenna units and changing at least one of a second set of uplink scrambling codes used by a second one of the at least two antenna units in response to determining that a first one of the access terminals has moved from coverage of the first one of the antenna units to the second one of the antenna units.

* * * * *